US011132183B2

(12) United States Patent
Gupta et al.

(10) Patent No.: US 11,132,183 B2
(45) Date of Patent: Sep. 28, 2021

(54) SOFTWARE DEVELOPMENT PLATFORM FOR TESTING AND MODIFYING DECISION ALGORITHMS

(71) Applicant: EQUIFAX, INC., Atlanta, GA (US)

(72) Inventors: Sandeep Gupta, Alpharetta, GA (US); Christian Hall, Canton, GA (US); James Reid, Alpharetta, GA (US); Shen Lu, Duluth, GA (US); Dennis Horton, Buford, GA (US); Lee Grice, Cumming, GA (US); Thresa Dixon, Canton, GA (US); Scott Garten, Canton, GA (US); Sudhakar Reddy, Suwanee, GA (US)

(73) Assignee: EQUIFAX INC., Atlanta, GA (US)

(*) Notice: Subject to any disclaimer, the term of this patent is extended or adjusted under 35 U.S.C. 154(b) by 588 days.

(21) Appl. No.: 15/903,001

(22) Filed: Feb. 22, 2018

(65) Prior Publication Data

US 2018/0189680 A1 Jul. 5, 2018

Related U.S. Application Data

(60) Continuation-in-part of application No. 12/257,453, filed on Oct. 24, 2008, now abandoned, which is a (Continued)

(51) Int. Cl.

*G06Q 40/00* (2012.01)
*G06F 8/38* (2018.01)

(Continued)

(52) U.S. Cl.

CPC ............... *G06F 8/38* (2013.01); *G06N 5/025* (2013.01); *G06N 5/04* (2013.01); *G06N 20/00* (2019.01);

(Continued)

(58) Field of Classification Search

CPC ...... G06Q 40/025; G06Q 40/00; G06Q 40/02; G06Q 20/10; G06Q 20/102; G06Q 20/40;

(Continued)

(56) References Cited

U.S. PATENT DOCUMENTS

| | | | |
|---|---|---|---|
| 5,262,941 | A | 11/1993 | Saladin et al. |
| 5,404,509 | A | 4/1995 | Klein et al. |

(Continued)

FOREIGN PATENT DOCUMENTS

| | | |
|---|---|---|
| CA | 2312641 | 12/2000 |
| EP | 1676189 | 7/2006 |

(Continued)

OTHER PUBLICATIONS

Gagnon, G. "Version-Control Software—Tools for managing change in complex development environments", PC Magazine, Mar. 4, 1997,16(5), 219-226.*

(Continued)

*Primary Examiner* — Hani M Kazimi

(74) *Attorney, Agent, or Firm* — Kilpatrick Townsend & Stockton LLP

(57) ABSTRACT

This disclosure involves development and deployment platforms for decision algorithms. For example, a computing system provides software development interface to a client device. The system sets, based on an input from the client device via the interface, a decision engine to a test mode that causes the decision engine to operate on test data stored in a first database and that prevents the decision engine from applying operations from the client device to production data stored in a second database. The system also configures the decision engine in the test mode to execute a different decision algorithms on the test data. The system also sets, based on another input via the interface, the decision engine to a deployment mode that causes the decision engine to (Continued)

operate on the production data. The system configures the decision engine in the deployment mode to execute one or more of the tested decision algorithms.

20 Claims, 22 Drawing Sheets

Related U.S. Application Data division of application No. 10/546,931, filed as application No. PCT/US2004/028020 on Aug. 27, 2004, now Pat. No. 7,970,698.

(60) Provisional application No. 60/498,395, filed on Aug. 27, 2003.

(51) Int. Cl.

| | |
|---|---|
| ***G06Q 40/02*** | (2012.01) |
| ***G06Q 20/10*** | (2012.01) |
| ***G06N 20/00*** | (2019.01) |
| ***G06N 5/02*** | (2006.01) |
| ***G06N 5/04*** | (2006.01) |

(52) U.S. Cl.
CPC ............. *G06Q 20/10* (2013.01); *G06Q 40/00* (2013.01); *G06Q 40/02* (2013.01); *G06Q 40/025* (2013.01)

(58) Field of Classification Search
CPC .......... G06Q 40/04; G06N 20/00; G06N 5/04; G06N 5/025
USPC ............................................................ 705/38
See application file for complete search history.

(56) References Cited

U.S. PATENT DOCUMENTS

| | | | | |
|---|---|---|---|---|
| 5,414,838 | A | 5/1995 | Kolton et al. | |
| 5,583,760 | A | 12/1996 | Klesse | |
| 5,696,907 | A | 12/1997 | Tom | |
| 5,721,903 | A | 2/1998 | Anand et al. | |
| 5,778,357 | A | 7/1998 | Kolton et al. | |
| 5,797,133 | A | 8/1998 | Jones et al. | |
| 5,870,721 | A | 2/1999 | Norris | |
| 5,926,784 | A | 7/1999 | Richardson et al. | |
| 5,930,764 | A | 7/1999 | Melchione et al. | |
| 5,940,811 | A | 8/1999 | Norris | |
| 5,963,894 | A | 10/1999 | Richardson et al. | |
| 6,052,694 | A | 4/2000 | Bromberg | |
| 6,067,549 | A | 5/2000 | Smalley et al. | |
| 6,073,129 | A | 6/2000 | Levine et al. | |
| 6,088,686 | A | 7/2000 | Walker et al. | |
| 6,105,007 | A | 8/2000 | Norris | |
| 6,163,781 | A | 12/2000 | Wess, Jr. | |
| 6,195,662 | B1 | 2/2001 | Ellis et al. | |
| 6,240,422 | B1 | 5/2001 | Atkins et al. | |
| 6,256,640 | B1 | 7/2001 | Smalley et al. | |
| 6,263,447 | B1 | 7/2001 | French et al. | |
| 6,282,658 | B2 | 8/2001 | French et al. | |
| 6,285,380 | B1 | 9/2001 | Perlin et al. | |
| 6,285,998 | B1 | 9/2001 | Black et al. | |
| 6,295,536 | B1 | 9/2001 | Sanne | |
| 6,321,206 | B1 | 11/2001 | Honarvar | |
| 6,321,339 | B1 | 11/2001 | French et al. | |
| 6,343,279 | B1 | 1/2002 | Bissonette et al. | |
| 6,356,903 | B1 | 3/2002 | Baxter et al. | |
| 6,401,098 | B1 | 6/2002 | Moulin | |
| 6,405,173 | B1 | 6/2002 | Honarvar et al. | |
| 6,415,259 | B1 | 7/2002 | Wolfinger et al. | |
| 6,415,298 | B1 | 7/2002 | Oesterer et al. | |
| 6,424,979 | B1 | 7/2002 | Livingston et al. | |
| 6,430,545 | B1 | 8/2002 | Honarvar et al. | |
| 6,430,556 | B1 | 8/2002 | Goldberg et al. | |
| 6,456,986 | B1 | 9/2002 | Boardman et al. | |
| 6,463,439 | B1 | 10/2002 | Dahlberg | |
| 6,496,936 | B1 | 12/2002 | French et al. | |
| 6,523,028 | B1 | 2/2003 | DiDomizio et al. | |
| 6,532,450 | B1 | 3/2003 | Brown et al. | |
| 6,546,545 | B1 | 4/2003 | Honarvar et al. | |
| 6,557,009 | B1 | 4/2003 | Singer et al. | |
| 6,598,067 | B1 | 7/2003 | Wydra et al. | |
| 6,601,034 | B1 | 7/2003 | Honarvar et al. | |
| 6,606,740 | B1 | 8/2003 | Lynn et al. | |
| 6,609,120 | B1 | 8/2003 | Honarvar et al. | |
| 6,611,809 | B1 | 8/2003 | McCalden | |
| 6,621,930 | B1 | 9/2003 | Smadja | |
| 6,643,625 | B1 | 11/2003 | Acosta et al. | |
| 6,684,192 | B2 | 1/2004 | Honarvar et al. | |
| 6,741,982 | B2 | 5/2004 | Soderstrom et al. | |
| 6,823,319 | B1 | 11/2004 | Lynch et al. | |
| 7,003,560 | B1 | 2/2006 | Mullen et al. | |
| 7,010,546 | B1 | 3/2006 | Kolawa et al. | |
| 7,136,873 | B2 | 11/2006 | Smith et al. | |
| 7,181,438 | B1 | 2/2007 | Szabo | |
| 7,191,150 | B1 | 3/2007 | Shao et al. | |
| 7,380,213 | B2 | 5/2008 | Pokorny | |
| 7,747,559 | B2 | 6/2010 | Leitner et al. | |
| 7,970,698 | B2 | 6/2011 | Gupta et al. | |
| 8,108,301 | B2 | 1/2012 | Gupta et al. | |
| 8,700,597 | B2 | 4/2014 | Gupta et al. | |
| 2002/0026443 | A1 | 2/2002 | Chang et al. | |
| 2002/0040339 | A1 | 4/2002 | Dhar et al. | |
| 2002/0066077 | A1* | 5/2002 | Leung .................. | G06F 11/368 717/126 |
| 2002/0069193 | A1 | 6/2002 | Beavin et al. | |
| 2002/0077823 | A1* | 6/2002 | Fox .......................... | G06F 8/34 704/260 |
| 2002/0077964 | A1 | 6/2002 | Brody et al. | |
| 2002/0095436 | A1* | 7/2002 | Lee .......................... | G06F 8/71 |
| 2002/0116244 | A1 | 8/2002 | Honarvar et al. | |
| 2002/0116702 | A1* | 8/2002 | Aptus ...................... | G06F 8/20 717/170 |
| 2002/0165855 | A1 | 11/2002 | Ohtomo | |
| 2002/0194120 | A1 | 12/2002 | Russell et al. | |
| 2003/0033289 | A1 | 2/2003 | Brinker et al. | |
| 2003/0037030 | A1* | 2/2003 | Dutta ...................... | G06F 8/71 |
| 2003/0110112 | A1 | 6/2003 | Johnson et al. | |
| 2003/0120529 | A1 | 6/2003 | Honarvar et al. | |
| 2003/0144950 | A1 | 7/2003 | O'Brien et al. | |
| 2003/0158919 | A1* | 8/2003 | Fomenko ................. | G06F 8/60 709/220 |
| 2003/0163414 | A1 | 8/2003 | O'Brien et al. | |
| 2003/0177079 | A1 | 9/2003 | Krajewski et al. | |
| 2003/0195828 | A1 | 10/2003 | Honarvar et al. | |
| 2003/0204426 | A1 | 10/2003 | Honarvar et al. | |
| 2004/0039687 | A1 | 2/2004 | Lent et al. | |
| 2004/0054610 | A1 | 3/2004 | Amstutz et al. | |
| 2004/0078320 | A1 | 4/2004 | DeFrancesco et al. | |
| 2004/0088158 | A1 | 5/2004 | Sheu et al. | |
| 2004/0098359 | A1 | 5/2004 | Bayliss et al. | |
| 2004/0098371 | A1 | 5/2004 | Bayliss et al. | |
| 2004/0098372 | A1 | 5/2004 | Bayliss et al. | |
| 2004/0098373 | A1 | 5/2004 | Bayliss et al. | |
| 2004/0098374 | A1 | 5/2004 | Bayliss et al. | |
| 2004/0098390 | A1 | 5/2004 | Bayliss et al. | |
| 2004/0148271 | A1 | 7/2004 | Wood | |
| 2004/0230967 | A1* | 11/2004 | Yuknewicz ............... | G06F 8/71 717/170 |
| 2005/0086579 | A1 | 4/2005 | Leitner | |
| 2005/0154692 | A1 | 7/2005 | Jacobsen et al. | |
| 2006/0010425 | A1* | 1/2006 | Willadsen ................ | G06F 8/71 717/120 |
| 2007/0022027 | A1 | 1/2007 | Gupta et al. | |
| 2007/0118519 | A1 | 5/2007 | Yamasawa et al. | |
| 2007/0179827 | A1 | 8/2007 | Gupta et al. | |
| 2009/0044096 | A1 | 2/2009 | Gupta et al. | |

(56) References Cited

U.S. PATENT DOCUMENTS

| | | | |
|---|---|---|---|
| 2009/0048999 | A1 | 2/2009 | Gupta et al. |
| 2009/0112753 | A1 | 4/2009 | Gupta et al. |

FOREIGN PATENT DOCUMENTS

| | | |
|---|---|---|
| EP | 2186000 | 5/2010 |
| WO | 2002071393 | 9/2002 |
| WO | 2004114160 | 12/2004 |
| WO | 2005022348 | 3/2005 |
| WO | 2009021011 | 2/2009 |

OTHER PUBLICATIONS

U.S. Appl. No. 10/546,931 , "Advisory Action", dated Feb. 2, 2010, 3 Pages.
U.S. Appl. No. 10/546,931 , "Notice of Allowance", dated Feb. 22, 2011, 15.
U.S. Appl. No. 10/546,931 , "Office Action", dated Aug. 28, 2008.
U.S. Appl. No. 10/546,931 , "Office Action", dated Oct. 1, 2009.
U.S. Appl. No. 10/546,931 , "Office Action", dated Dec. 23, 2008.
U.S. Appl. No. 10/546,931 , "Office Action", dated Jan. 4, 2011, 20 Pages.
U.S. Appl. No. 10/546,931 , "Office Action", dated May 25, 2010, 23 pages.
U.S. Appl. No. 10/546,931 , "Office Action", dated Feb. 5, 2010, 3 pages.
U.S. Appl. No. 10/546,931 , "Response Office Action", dated Mar. 31, 2010, 25 pages.
U.S. Appl. No. 10/546,931 , "Response to Office Action", dated Aug. 20, 2010, 23 pages.
U.S. Appl. No. 10/546,931 , "Response to Office Action", dated Dec. 2, 2009, 28 pages.
U.S. Appl. No. 10/546,931 , "Response to Office Action", dated May 22, 2009.
U.S. Appl. No. 10/868,476 , "Non-Final Office Action", dated Sep. 22, 2009.
U.S. Appl. No. 10/868,476 , "Notice of Allowance", dated Feb. 17, 2010, 12 Pages.
U.S. Appl. No. 10/868,476 , "Office Action", dated Nov. 10, 2008.
U.S. Appl. No. 10/868,476 , "Office Action", dated Feb. 23, 2009.
U.S. Appl. No. 10/868,476 , "Office Action", dated Jun. 17, 2009.
U.S. Appl. No. 10/868,476 , "Office Action", dated Sep. 22, 2009.
U.S. Appl. No. 10/868,476 , "Office Action", dated Feb. 5, 2008, 24 pages.
U.S. Appl. No. 12/186,682 , "Amendment and Response to Non-Final Office Action", dated Jun. 29, 2011, 14.
U.S. Appl. No. 12/186,682 , "Final Office Action", dated Sep. 2, 2011.
U.S. Appl. No. 12/186,682 , "Final Office Action", dated Sep. 2, 2011, 16.
U.S. Appl. No. 12/186,682 , "Final Office Action", dated Sep. 21, 2011, 17.
U.S. Appl. No. 12/186,682 , "Final Office Action", dated Apr. 4, 2013, 23 Pages.
U.S. Appl. No. 12/186,682 , "Non Final Office Action", dated Aug. 26, 2013, 9 pages.
U.S. Appl. No. 12/186,682 , "Non-Final Office Action", dated Mar. 29, 2011, 17.
U.S. Appl. No. 12/186,682 , "Non-Final Office Action Response", dated Jun. 29, 2011.
U.S. Appl. No. 12/186,682 , "Notice of Allowance", dated Dec. 5, 2013, 7 Pages.
U.S. Appl. No. 12/186,682 , "Office Action", dated Oct. 23, 2012, 17.
U.S. Appl. No. 12/186,682 , "Office Action", dated May 25, 2012, 19.
U.S. Appl. No. 12/186,682 , "Office Action", dated Dec. 21, 2011, 20.
U.S. Appl. No. 12/186,682 , "Office Action", dated Mar. 29, 2011, 36.
U.S. Appl. No. 12/186,682 , "Response to Non-Final Office Action", dated Jun. 29, 2011, 14.
U.S. Appl. No. 12/257,442 , "Advisory Action", dated Dec. 22, 2010, 3.
U.S. Appl. No. 12/257,442 , "Final Office Action", dated Nov. 10, 2010, 16.
U.S. Appl. No. 12/257,442 , "Notice of Allowance", dated Sep. 29, 2011, 21.
U.S. Appl. No. 12/257,442 , "Office Action", dated Feb. 2, 2010, 15.
U.S. Appl. No. 12/257,442 , "Office Action", dated Jul. 8, 2010, 16.
U.S. Appl. No. 12/257,442 , "Office Action", dated Jul. 2, 2009, 17.
U.S. Appl. No. 12/257,442 , "Response to Office Action", dated Oct. 2, 2009.
U.S. Appl. No. 12/257,442 , "Response to Office Action", dated Aug. 20, 2010, 20.
U.S. Appl. No. 12/257,453 , "Advisory Action", dated Aug. 18, 2010, 3.
U.S. Appl. No. 12/257,453 , "Final Office Action", dated Jul. 15, 2015, 8 pages.
U.S. Appl. No. 12/257,453 , "Non Final Office Action", dated Oct. 29, 2014, 5 pages.
U.S. Appl. No. 12/257,453 , "Non-Final Office Action", dated Oct. 23, 2014, 5 pages.
U.S. Appl. No. 12/257,453 , "Notice of Allowance", dated Jun. 6, 2014, 11 pages.
U.S. Appl. No. 12/257,453 , "Office Action", dated Oct. 2, 2009.
U.S. Appl. No. 12/257,453 , "Office Action", dated Mar. 30, 2010, 16.
U.S. Appl. No. 12/257,453 , "Office Action", dated Jun. 27, 2011, 20.
U.S. Appl. No. 12/257,453 , "Response to Non-Final Office Action", dated Sep. 27, 2011.
U.S. Appl. No. 12/257,453 , "Response to Office Action", dated Dec. 30, 2009, 13.
U.S. Appl. No. 12/257,453 , "Response to Office Action", dated May 28, 2010, 17.
Dec. 31, 1989 , "German Version—Datenbankdialog in gesprochener Sprache-Linguistische Analyse in SPICOS II", IT Informationstechnik, Oldenbourq Verlag, Munche, DE, vol. 31, Dec. 31, 1989, 10.
ABA Bank Compliance , "Credit Scoring Primer", vol. 17, No. 5, May 8, 1996, pp. 1-2.
Aleskerov et al., "Cardwatch: a neural network based database mining system for credit card fraud detection", IEEE, Mar. 1997, pp. 24-25.
Alice Corporation Pty. Ltd. V. C et al., "Certiorari to the United States Court of Appeals for the Federal Circuit", Supreme Court of the United States, No. 13-298, Oct. 2013, 21 pages.
Anonymous , "Credit scoring primer", ABA Bank Compliance, vol. 17, No. 5, May 8, 1996, 2 pages.
Business Wire , "QSpace.com Teams with the Forms Group to Offer Instant Web-Loan Decisioning to Community Banks", Mar. 22, 2000, pp. 1-3.
Canadian Patent Application No. 2,536,097 , "Office Action", dated Feb. 5, 2014, 3 pages.
Canadian Patent Application No. 2,536,097 , "Office Action", dated Jun. 6, 2012, 5.
Canadian Patent Application No. 2,536,097 , "Office Action", dated Feb. 19, 2015, 6 pages.
Canadian Patent Application No. 2,536,097 , "Office Action", dated Feb. 26, 2016, 7 pages.
Canadian Patent Application No. 2,695,898 , "Notice of Allowance", dated Aug. 8, 2016, 1 page.
Canadian Patent Application No. 2,695,898 , "Office Action", dated Dec. 2, 2014, 2 pages.
Canadian Patent Application No. 2,695,898 , "Office Action", dated Oct. 26, 2015, 4 pages.
Canadian Patent Application No. 2,921,562 , "Notice of Allowance", dated Jul. 25, 2017, 1 page.
Canadian Patent Application No. 2,921,562 , "Office Action", dated Jan. 26, 2017, 3 pages.

(56) References Cited

OTHER PUBLICATIONS

Carpenter , "Decision-Support Software Speeds Credit Analysis", Commercial Lending Review, Winter 1991-92, 97.
Computer Finance , "The Data Clean-Up Payback Calculation—Pt. 1", Jan. 1, 1997, 7.
Computer Finance , "The Data Clean-Up Payback Calculation—Pt.-1", 7(8), Jan. 1, 1997, 1-6.
Covaliu , "Decision Analysis: Concepts, Tools and Promise", A Fair Isaac White Paper, May 2001, pp. 1-19.
European Patent Application No. 04782491.7 , "Office Action", dated Dec. 21, 2007.
European Patent Application No. 04782491.7 , "Office Action", dated May 12, 2010.
European Patent Application No. 08797250.1 , "Extended Search Report", dated Aug. 5, 2011, 6.
European Patent Application No. 08797250.1 , "Office Action", dated Feb. 3, 2017, 5 pages.
European Patent Application No. 08797250.1 , "Response to Rule 70(2) and 70a(2) EPC", filed on Feb. 23, 2012 (22 pages).
Evans et al., "Specifications", Online! XP002315765 Martin Fowler Homepage, http://martinfowler.com/apsupp/spec.pd, Mar. 23, 2003, pp. 1-19.
Fowler , "Patterns of Enterprise Application Architecture", Addison Wesley and Benjamin Cummings, XP002315766, Nov. 2002, pp. 316-327.
Friedland et al., "CUs move toward industry-specific scoring", Credit Union News, Aug. 25, 1995, 15(16):1-2.
Han et al., "Data Mining: Concepts and Techniques", Morgan Kaufman Publishers, 340 Pine Street, 6th Floor, San Francisco, CA, XP002332057, 2001, pp. 5-15, 23, 45-47, 58-61, 119-121, 453-454.
Kanungo et al., "Evaluation of a decision support system for credit management decisions", Decision Support Systems, Sep. 29, 2011, 30,4; 419-436.
Knauf et al., "Insurers Look To Demystify Credit Scoring", National Underwriter / Property & Casualty Risk & Benefits Management, vol. 105(50), Dec. 2001, pp. 25-28.
Lee , "Equifax Aims to Get Closer To Lenders With Analytics", American Banker, Apr. 1, 2004, 7.
Lobel et al., "Lexikon der Datenverarbeitung", Verlag Moderne Industrie, 8910 Landsberg, Germany, XP002332058, 1982, pp. 656-663.
Mangiavacchi et al., "Innovative learning capabilities in a natural language user interface for computer based measurement systems", Instrumentation and Measurement, IEEE Transactions, vol. 39 Issue: 1, Feb. 1990, 121-125.
Niedermair , "Database-Dialog in Spoken Language-Linguistic Analysis in SPICOS II", IT Informationstechnik, Oldenbourg Verlag Munich, DE, vol. 31, No. 6,, Dec. 31, 1989, 14.
Niedermair , "Datenbankdialog in gesprochener Sprache-Linguistische Analyse in SPICOS II", IT Informationstechnik, Oldenbourg Verlag, Munche, DE, vol. 31, No. 1, Dec. 31, 1989, 10.
Niedermair , "Datenbankdialog in Gesprocher Sprache-Linguistische Analyse in SPICOS II", Informationstechnik IT, Oldenbourg Verlag. Munchen, DE, vol. 31, No. 6 (24 pages), Dec. 1, 1989, 382-391.
International Patent Application No. PCT/US2004/019136 , "International Preliminary Report on Patentability and Written Opinion", dated Dec. 13, 2005.
International Patent Application No. PCT/US2004/019136 , "International Search Report".
International Patent Application No. PCT/US2004/028020 , "International Preliminary Report on Patentability", dated Apr. 26, 2007.
International Patent Application No. PCT/US2004/028020 , "International Search Report", dated Feb. 5, 2007, 4 Pages.
International Patent Application No. PCT/US2004/028020 , "International Search Report and Writtern Opinion", dated Feb. 5, 2009, 4 Pages.
International Patent Application No. PCT/US2008/072297 , "International Preliminary Report on Patentability", dated Feb. 18, 2010, 6 Pages.
International Patent Application No. PCT/US2008/072297 , "International Search Report and Written Opinion", dated Mar. 30, 2009, 30 Pages.
Pressman , "Software Engineering: A Practitioner's Approach", McGraw Hill Publishing Company, Shoppenhangers Road, Maidenhead, Berkshire SL6 2QL, XP002315833, 1994, pp. 610-616.
Rezaee et al., "Continuous Auditing: Building Automated Auditing Capability", Auditing: A Journal of Practice & Theory, vol. 21, No. 1, Mar. 2002, pp. 147-163.
Rob et al., "Database Systems: Design, Implementation and Management, 2nd Edition", International Thomson Publishing Inc., One Corporate Place, Ferncroft Village, Danvers, Massachusetts 01923 USA, 1995, pp. 125-130.
Seisint Brochure Version 1.0 , "Seisint Data Supercomputer Overview", Mar. 2004, pp. 1-7.
Zoot Enterprises, Inc. , "Criteria Development Tool, Funtionality Summary, Version 5.0", Bozeman, MT, 2003.
Zoot Enterprises, Inc. , "SPOC Decision Engine", Bozeman, MT, 2003.
Zoot Enterprises, Inc., , "CB Manual, Bozeman, MT", Sep. 24, 2000.
Zoot Enterprises, Inc., , "untitled, Bozeman, MT", Jun. 10, 1996.
Zoot Enterprises, Inc., , "Web Applications, Bozeman, Mt", 2004.
Zoot Enterprises, Inc., , "WebRules Release 5.0 Enhancements, Bozeman, MT", Dec. 16, 2002.
Zoot Enterprises, Inc., , "WebRules: Zoot Criteria Development Tool, Release Notes, Version 5.0 Production Install", Bozeman, MT, Jul. 7, 2003.

* cited by examiner

1200

1204 1202 1206 1210 1214

| Beacon: 96 | Total Loan Amount | Decision | Decision Status |
|---|---|---|---|
| 620 ≤ v ≤ 999... | 0 ≤ v ≤ 3500... | Approve with 0% down | approved |
| | 3501 ≤ v ≤ 999999... | Manual Review | pending |
| 550 ≤ v ≤ 578... | 0 ≤ v ≤ 1000... | Approve with 0% down | approved |
| | 1001 ≤ v ≤ 3000... | Approve 10% down | approved with c... |
| | 3001 ≤ v ≤ 999999... | Manual Review | pending |
| 579 ≤ v ≤ 619... | 0 ≤ v ≤ 1000... | Approve with 0% down | approved |
| | 1001 ≤ v ≤ 3000... | Approve with 10% down | approved with c... |
| | 3001 ≤ v ≤ 999999... | Manual Review | pending |
| 550 ≤ v ≤ 578... | 0 ≤ v ≤ 1500... | Approve with 0% down | approved |
| | 1501 ≤ v ≤ 2500... | Approve with 10% down | approved with c... |
| | 2501 ≤ v ≤ 999999... | Manual Review | pending |
| 579 ≤ v ≤ 619... | 0 ≤ v ≤ 2000... | Approve with 0% down | approved |
| | 2001 ≤ v ≤ 3000... | Approve with 10% down | approved with c... |
| | 3001 ≤ v ≤ 999999... | Manual Review | pending |

| Multi Screen 2.0 | Beacon: 96 | Decision Status | Decision | ODA | PLOC | Credit Card |
|---|---|---|---|---|---|---|
| A | 0 ≤ v ≤ 680... | declined | Declined | | —— | —— |
| | 681 ≤ v ≤ 740... | approvedwithoffers | Approved A... | Offer Free | $2,500 | Gold $7,500 |
| | 741 ≤ v ≤ 760... | approvedwithoffers | Approved A... | Offer Free | $2,500 | Gold $10,000 |
| | ≤ v ≤ 761... | approvedwithoffers | Approved A... | Offer Free | $2,500 | Gold $10,000 |
| B | 0 ≤ v ≤ 660... | declined | Declined | —— | —— | —— |
| | 661 ≤ v ≤ 700... | approvedwithoffers | Approved A... | Offer Basic | $2,000 | Basic $4,000 |
| | 701 ≤ v ≤ 760... | approvedwithoffers | Approved A... | Offer Free | $2,000 | Gold $5,000 |
| | ≤ v ≤ 761... | approvedwithoffers | Approved A... | Offer Free | $2,000 | Gold $7,600 |
| C | 0 ≤ v ≤ 660... | declined | Declined | —— | —— | —— |
| | 661 ≤ v ≤ 700... | approvedwithoffers | Approved A... | Offer Basic | $1,000 | Basic $2,000 |
| | 701 ≤ v ≤ 760... | approvedwithoffers | Approved A... | Offer Basic | $1,500 | Basic $3,000 |
| | ≤ v ≤ 761... | approvedwithoffers | Approved A... | Offer Basic | $1,500 | Basic $1,000 |
| D | 0 ≤ v ≤ 720... | declined | Declined | —— | —— | —— |
| | 721 ≤ v ≤ 780... | approvedwithoffers | Approved A... | Offer Basic | —— | Basic $1,500 |
| | ≤ v ≤ 781... | approvedwithoffers | Approved A... | Offer Basic | $500 | Basic $2,000 |
| E | 0 ≤ v ≤ 740... | declined | Declined | —— | —— | —— |
| | ≤ v ≤ 741... | approvedwithoffers | Approved A... | Offer Basic | Basic $1,000 | —— |

SOFTWARE DEVELOPMENT PLATFORM FOR TESTING AND MODIFYING DECISION ALGORITHMS

CROSS REFERENCE TO RELATED APPLICATIONS

This disclosure is a continuation-in-part of, and claims priority to, U.S. patent application Ser. No. 12/257,453, filed Oct. 24, 2008, which is a divisional application of U.S. patent application Ser. No. 10/546,931, filed Aug. 10, 2006, which is the United States national phase of International Application No. PCT/US2004/028020 filed on Aug, 27, 2004, which claims the benefit to U.S. Provisional Application No. 60/498,395, filed on Aug. 27, 2003, each of which is hereby incorporated by reference.

TECHNICAL FIELD

This disclosure involves interfaces and tools for creating and modifying software, and more particular involves software development platforms for performing one or more of testing, modifying, and deploying decision algorithms.

BACKGROUND

Development systems are used for controlling data processing operations that develop software programs executed by processing devices. These operations can include, for example, maintaining different versions of source code under development to facilitate software development. Development platforms can be executed by client devices to modify this source code in one or more versions, thereby changing the operations that processing devices will perform when executing this code.

SUMMARY

Various embodiments involve software development platforms for performing one or more of testing, modifying, and deploying decision algorithms. For example, a computing system provides software development interface to a client device. The system sets, based on an input from the client device via the interface, a decision engine to a test mode that causes the decision engine to operate on test data stored in a first database and that prevents the decision engine from applying operations from the client device to production data stored in a second database. The system also configures the decision engine in the test mode to execute a different decision algorithms on the test data. The system also sets, based on another input via the interface, the decision engine to a deployment mode that causes the decision engine to operate on the production data. The system configures the decision engine in the deployment mode to execute one or more of the tested decision algorithms.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim. The foregoing, together with other features and examples, will become more apparent upon referring to the following specification, claims, and accompanying drawings.

BRIEF DESCRIPTION OF THE DRAWINGS

These and other features, aspects, and advantages of this disclosure are better understood when the following Detailed Description is read with reference to the accompanying drawings.

FIG. 12 depicts another example of a user interface for a data output component, in accordance with certain embodiments.

FIG. 13 depicts another example of a user interface for a data output component, in accordance with certain embodiments.

DETAILED DESCRIPTION

Figure 1:
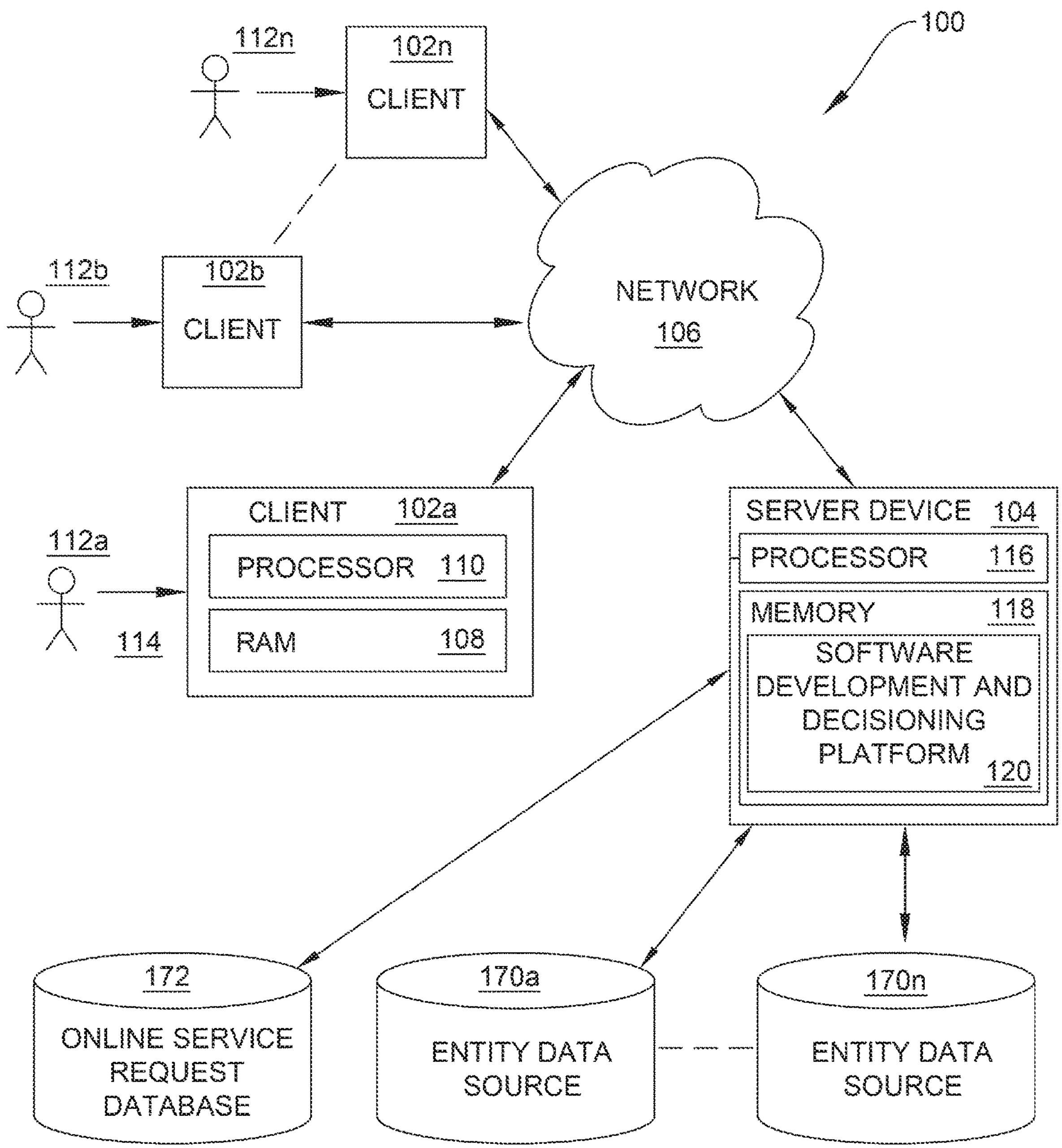
FIG. 1 depicts an example of a computing environment for developing and deploying decision algorithms, in accordance with certain embodiments.

Various embodiments involve software development and decisioning platforms for performing one or more of testing, modifying, and deploying decision algorithms. For example, a software development computing system can provide a software management interface to one or more client devices. The software management interface allows real-time switching from test data sources to production data sources, switching among different decision algorithms to be tested, etc. For example, in a given computing session, the software management interface allows an end user device to toggle between a test environment, which allows program code for a decision algorithm to be tested and refined while protecting live data sources from being impacted by the execution of a decision algorithm, and a live environment to which the tested and refined program code for the decision algorithm can be deployed. Thus, software development and decisioning platforms described herein can allow for the efficient creation and deployment of software code.

In one example, a software development system establishes a communication session with a client computing device. The software development system acts as a point of interface between the client computing device and one or more data sources to which decision algorithms can be applied, such as a first database in which test data is stored and a second database in which production data is stored. The software development system can implement this functionality by, for example, providing a software management interface to the client computing devices via one or more data networks. The software management interface can include one or more menus or other elements for selecting different decision algorithms (e.g., a current version and an alternative version of an algorithm). The software management interface can include one or more menus or other elements switching between a mode in which decision algorithms are applied to the segregated test data and a mode in which decision algorithms are applied to the live production data.

Continuing with this example, the software development system configures a development environment into a test mode based on the client computing device selecting, via the software management interface, the test data. In the test mode, the software development system executes different decision algorithms by applying one or more operations of these algorithms to the test data. Applying these operations to the test data can prevent live production data from being corrupted or otherwise modified. In some embodiments, the software development system can display results of these tests via the software management interface and can modify, based on subsequent inputs received via the software management interface, program code of a decision algorithm. Modifying the program code of a decision algorithm can include modifying an order of code modules in the decision algorithm, adding code modules or data objects to the decision algorithm, etc. Within the same session with the client computing device, the software development system can also switch to a deployment mode that involves deploying a tested and refined decision algorithm to a production environment. Deploying a tested and refined decision algorithm to a production environment can include, for example, providing one or more analytical servers with access to the program code of the decision algorithm and instructing the analytical servers to execute the program code by applying one or more operations of the decision algorithm to live production data.

Certain embodiments described herein provide improved computing systems for programming decision algorithms. For example, existing systems fail to provide selective access to different data sources, including segregated test data sources and live data sources, in a common interface. By contrast, software development and decisioning systems described herein provide a common interface for selectively switching between test data sources and live data sources, thereby allowing for efficient testing and refinement of program code in a test environment and deployment of the refined program code to a live environment. Accordingly, automated computing systems that rely on decision algorithms developed as described herein can be reconfigured more efficiently and effectively as compared to existing systems. Furthermore, in some embodiments, various interfaces described herein provide intuitive functionality for defining decision algorithms via graphical representations of different algorithmic functions and connections between these functions. The movements of these graphical depictions (e.g., the connections, the icons, or both) can allow end users without programming knowledge to intuitively update program code of decision algorithms in real time.

Example of a Computing Environment for a Software Development and Decisioning Platform Referring now to the drawings in which like numerals indicate like elements throughout the several figures, FIG. 1 depicts an example of a software development and decisioning system 100. The software development and decisioning system 100 can include multiple client devices 102*a-n* in communication with one or more server devices 104 over one or more networks 106. Examples of the network 106 include the Internet as well as other wired and wireless networks, such as an intranet, local area network, wide area network, or broadcast network may be used. Moreover, methods according to this disclosure may operate within a single client or server device.

Each client device 102*a-n* shown in FIG. 1 includes at least one non-transitory computer-readable medium and at least one processing device 110. The computer-readable medium shown includes a random access memory 108 coupled to the processing device 110. The processing device 110 executes computer-executable program instructions stored in memory 108. Such processing devices may include a microprocessor, an application-specific integrated circuit, or other processing device. Such processing devices include or communicate with computer-readable media. The computer-readable media store instructions that, when executed by the processing device, cause the processing device to perform the steps described herein.

Embodiments of computer-readable media may include an electronic, optical, magnetic, or other storage or transmission device capable of providing a processing device, such as the processing device 110 of client device 102*a,* with computer-readable instructions. Other examples of suitable media may include a floppy disk, Compact Disk Read Only Memory ("CD-ROM"), magnetic disk, memory chip, Read Only Memory (ROM), Random Access Memory ("RAM"), an ASIC, a configured processing device, all optical media, all magnetic tape or other magnetic media, or any other suitable medium from which a computer processing device can read instructions or on which instructions, code, or other data may be stored. Also, various other forms of computer-readable media may transmit or carry instructions to a computer, including a router, private or public network, or other transmission device or channel, both wired and wireless. The instructions may include code from any suitable computer-programming language, including, for example, C, C++, C#, Visual Basic, Java, Python, Perl, and JavaScript.

Client devices 102*a-n* may also include a number of external or internal devices such as a mouse, a CD-ROM, a keyboard, a display, or other input or output devices. Examples of client devices 102*a-n* are personal computers, media center computers, televisions, television set-top boxes, digital assistants, personal digital assistants, cellular phones, mobile phones, smart phones, pagers, digital tablets, laptop computers, Internet appliances, and other processing device-based devices. In general, a client device 102*a-n* may be any type of processing device-based platform that may be connected to a network 106 and that interacts with one or more application programs. Client devices 102*a-n* may operate on any operating system, such as Microsoft® Windows® or Linux, capable of supporting one or more client application programs. For example, the client device 102*a* shown includes a personal computer executing client application programs, also known as client applications. The client applications can be contained in memory 108 and can include, for example, a media player application, a presentation application, an Internet browser application, a calendar/organizer application, and any other application or computer program capable of being executed by a client device.

Through the client devices 102*a-n,* users 112*a-n* can communicate over the network 106 with each other and with other systems and devices coupled to the network 106. As shown in FIG. 1, a server device 104 is also coupled to the network 106. In the example of FIG. 1, a user 112*a* can operate a client device 102*a* and to interact with the server device 104. Interacting with the server device 104 causes the server device 104 to execute one or more decision algorithms, which are process-executable sets of instructions, with respect to certain data sets (e.g., sensitive data such as credit data). The client device 102*a* electronically transmits, via the network 106, a signal corresponding to the request to the server device 104.

The server device 104 shown in FIG. 1 includes one or more processing devices 116 executing program code that implements a software development and decisioning platform 120. Similar to the client devices 102*a-n,* the server device 104 shown in FIG. 1 includes a processing device 116 coupled to a computer-readable memory 118. Server device 104, depicted in FIG. 1 as a single computer system, may be implemented as a network of computer processing devices. Examples of a server device are servers, mainframe computers, networked computers, a processing device-based device, and similar types of systems and devices.

Memory 118 on the server device 104 contains the software development and decisioning platform 120. A software development and decisioning platform 120 includes a software or hardware application that is configured to automatically process decision data objects, which include data items identifying one or more inputs to a decisioning algorithm, and to render a decision regarding such decision data objects. In response to a request from a client device, a decisioning platform (e.g., the software development and decisioning platform 120 shown in FIG. 1) can process a decision data object that is received from or otherwise identified by one or more client devices 102*a-n.* Processing the decision data object can include executing a decisioning algorithm using data retrieved from one or more entity data sources 170*a-n,* which include databases or other data structures identifying various entities (e.g., individuals, businesses, etc.) and storing data about these entities (e.g., sensitive data such as credit data). Decision data objects can be associated with an entity or a set of entities (also referred to respectively as "applicant" or "applicants," "customer" or "customers," "customer entity" or "customer entities," "consumer" or "consumer entities," etc.). In some embodiments, the software development and decisioning platform 120 can utilize information from at least one entity data source 170*a-n,* and apply one or more defined algorithmic functions to make a decision regarding a decision data object associated with a particular applicant.

An online service request database 172 or another suitable data storage device such as a memory device, hard drive, database, or other storage medium can communicate with the software development and decisioning platform 120. In some embodiments, an online communication sub-engine 200 of the software development and decisioning platform 120 can store a decision data object (e.g., an application requesting access to an online service, such as a credit application) and a new decision data object identifier or decision data object identification code in the online service request database 172. In additional or alternative embodiments, a decision sub-engine of the software development and decisioning platform 120 can store a decision and decision information in the online service request database 172. In these and other embodiments, the software development and decisioning platform 120 can retrieve stored decision data objects, information, new decision data object identifiers or decision data object identification codes, decisions, and decision information from the online service request database 172 as needed.

Although the processes described herein are described in relation to the client and server or servers, a client may perform any or all of the processes described as being performed by a server. Similarly, a server or servers may perform any or all of the processes described herein as being performed by a client, although the invention is not limited to client/server architecture, but can run on any desired topology or architecture as deemed fit for the purposes, whether existing as of the time of the writing of this document or thereafter.

Embodiments of this disclosure can include systems having different architecture than that which is shown in FIG. 1. For example, a server device 104 may include a single physical or logical server. The software development and decisioning system 100 shown in FIG. 1 is merely an example, and is used as an environment to help explain the example processes and methods shown in FIGS. 14-24.

Example of a Software Development and Decisioning Platform

Figure 2:
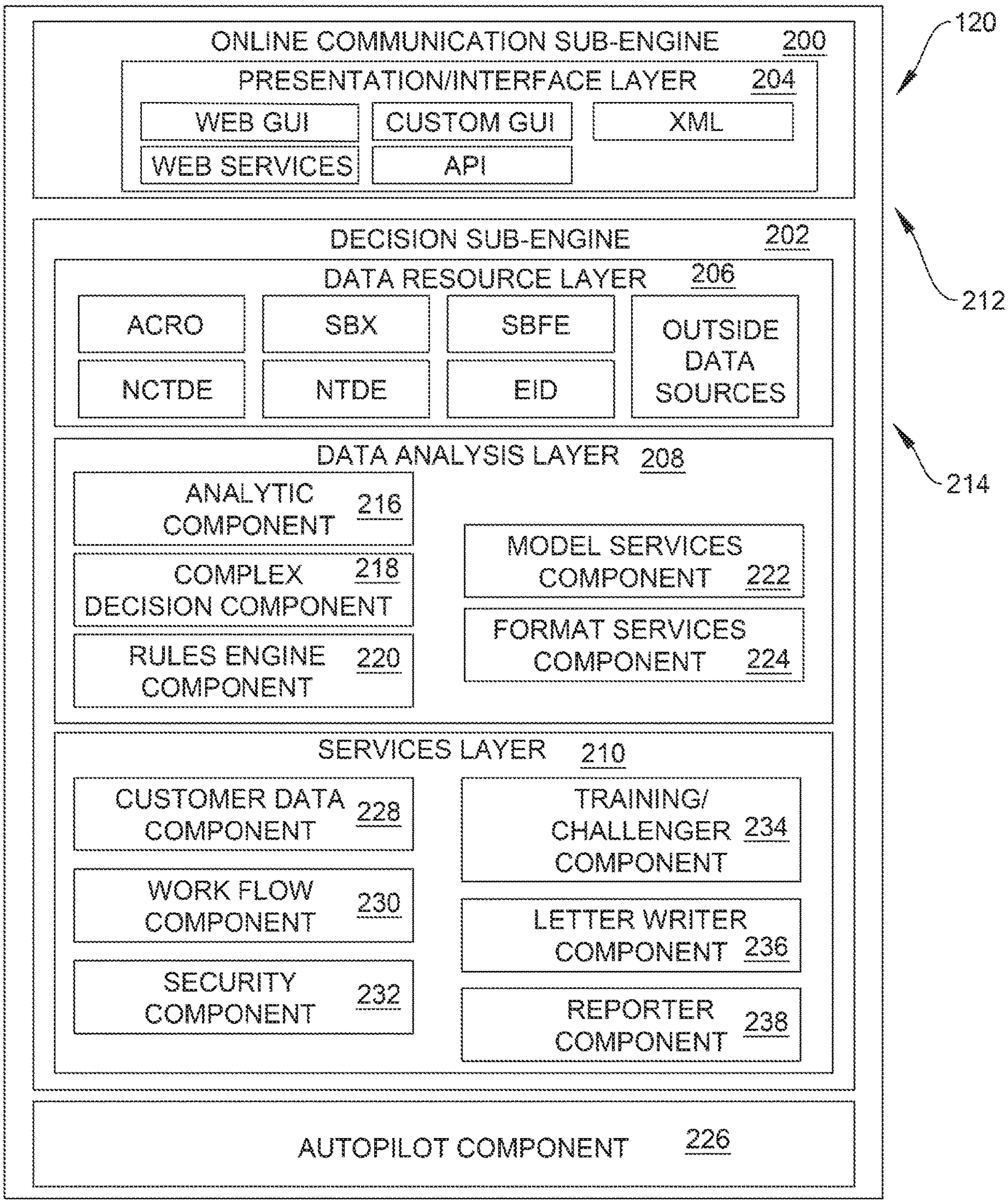
FIG. 2 depicts certain components for a software development and decisioning platform executed by one or more computing system, in accordance with certain embodiments.

As shown in FIG. 2, an example of the software development and decisioning platform 120 can include, but is not limited to, an online communication sub-engine 200 and a decision sub-engine 202. The online communication sub-engine 200 can include, but is not limited to, a presentation/ interface layer 204. The decision sub-engine 202 can include, but is not limited to, a data resource layer 206, a data analysis layer 208, and a services layer 210. Other engines, sub-engines, components, sub-components, layers, or modules for a software development and decisioning platform 120 can exist. In some embodiments, the components of the software development and decisioning platform 120 can support the automation of one or more decisioning operations performed with online services (e.g., credit decisions, loan-origination, account-acquisition lifecycle, application processing, etc.). In addition, the software development and decisioning platform 120 can include other components to achieve even greater automation, control and process efficiencies for users.

The embodiment described in FIG. 2 is one example of a software development and decisioning platform 120. Other engines, sub-engines, components, sub-components, layers, and modules, can operate in conjunction with or can otherwise be integrated with a software development and decisioning platform 120 shown in FIG. 2.

In the embodiment shown in FIG. 2, the software development and decisioning platform 120 can include, but is not limited to, an online communication sub-engine 200. The online communication sub-engine 200 can manage entity data from a point-of-entry through the completion of process performed by a decision algorithm. Various methods of entity evaluation and workflow management, including reduction of re-keying entity data, automatically redirecting inquiries into an appropriate worklist, and prioritizing workflow can save users significant time and expense. This component can operate in tandem with call center, letter-writing, and/or billing-type applications and systems. The online communication sub-engine 200 can improve quality of stored data by eliminating re-keying of application data, automatically redirecting inquiries into an appropriate worklist, etc. In some embodiments, previously disjointed, modular systems can be integrated via the online communication sub-engine 200, reducing time frames and expenses throughout the process, while increasing the volume and quality of online decision processing.

Figure 3:
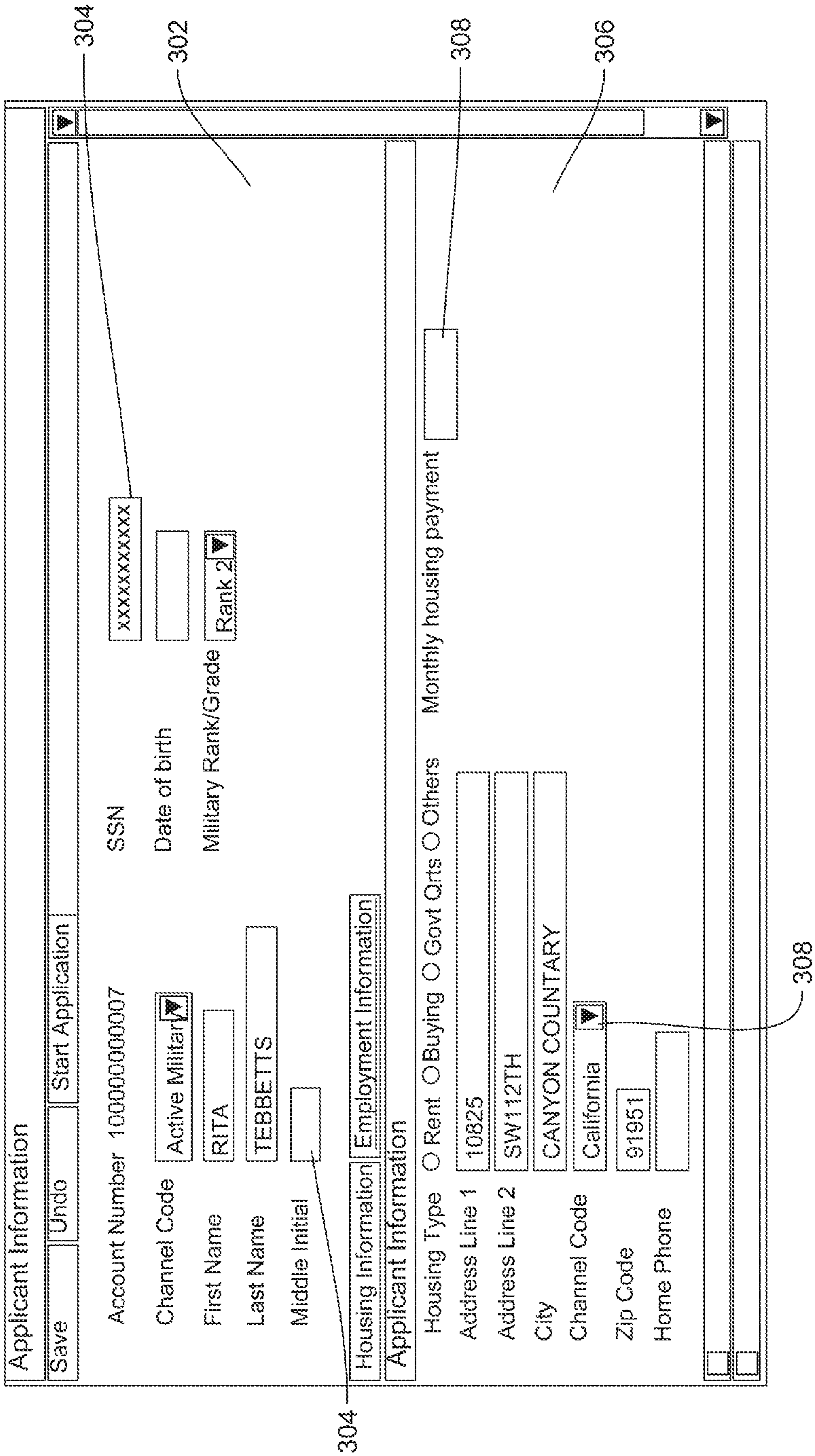
FIG. 3 depicts an example of a user interface that includes a service request form, in accordance with certain embodiments.

In some embodiments, a user interface such as a service request form 300 in FIG. 3 can be displayed by an online communication sub-engine 200 via an output device associated with one or more client devices 102*a-n*. The service request form 300 can prompt a client device to enter information such as entity data. The service request form 300 can collect the data for subsequent processing by the online communication sub-engine 200. One or more users 112*a-n* operating a keyboard, mouse, and/or other input device associated with one or more client devices 102*a-n* can enter information into the service request form 300.

In a simplified example shown in FIG. 3, the service request form can be used to collect information about an applicant for a bank loan. An upper portion 302 of the service request form 300 provides data entry devices 304 for entry of entity data or associated information such as channel code, first name, last name, middle initial, social security number (SSN), date of birth, and military rank/grade. Data entry devices 304 can include, but are not limited to, pull-down menus, data fields, radio buttons, and other devices to prompt and to collect and prompt information. A lower portion 306 of the service request form 300 provides one or more data entry devices 308 for entry of housing-type information such as housing type, address, city, state, zip code, home telephone number, and monthly housing payment. Other types of information including entity data can be collected with various service request forms, templates, webpages, or other types of data input devices, and subsequently used by the online communication sub-engine 200.

In some embodiments, an online communication sub-engine 200 for a software development and decisioning platform 120 can also be utilized for a commercial application. A predefined template, or other user interface similar to the service request form 300 shown in FIG. 3, can be employed to receive information from a client device about a particular business. Examples of data sources used by this platform can include, but are not limited to, Dunn & Bradstreet, Moody's, S&P, Experian Small Business, Equifax Small Business Exchange, Equifax Small Business Financial Exchange, etc.

The online communication sub-engine 200 can include, but is not limited to, a presentation/interface layer 204. In the example shown in FIG. 2, the presentation/interface layer 204 can provide functionality for configuring user-defined prompts, data fields, drop down menus, screen flows and work items pertinent to a particular user that enable efficient processing and review of entity data. As shown in the example of FIG. 2, a presentation/interface layer 204 can include one or more interfaces such as a graphical user interface ("GUI"), web GUI, custom GUI, extensible markup language ("XML"), web services, and application program interfaces ("API"). Such interfaces for the presentation/interface layer 204 can operate (individually or in an integrated fashion) to provide a front-end user interface for interaction between the software development and decisioning platform 120 and one of the users 112*a-n* operating a respective one of the client devices 102*a-n*. According to a preferred embodiment, the presentation/interface layer 204 can utilize software such as Transaction Logic Engine™ distributed by Versata, Inc. In additional or alternative embodiments, JAVA programming code and GUIs can be utilized to provide a suitable user interface environment for a presentation/interface layer 204.

FIG. 3 depicts an example of a user interface generated by software such as the Transaction Logic Engine™ software distributed by Versata, Inc. Connectivity of systems and processes according to certain embodiments with other entities and process can take any desired form, including the service request form 300 shown in FIG. 3.

In some embodiments, the presentation/interface layer 204 can capture a particular user's 112*a-n* user interface requirements and evaluate which features that deviate from a standard, default setting and would require some custom coding effort. The presentation/interface layer 204 can accommodate most special requests. Some of the common options handled by the presentation/interface layer 204 include the following features screen dimensions, user branding requirements, cascading style sheets, and user interface page headings.

In some embodiments, a presentation/interface layer 204 can generate templates or can otherwise utilize predefined templates for particular categories of end user activities. Templates can incorporate fundamental items relevant to a given category, including, but not limited to, core functions, core rules, core data sources, etc. Templates can also add to such information as a particular template or decision process is used.

Figure 14:
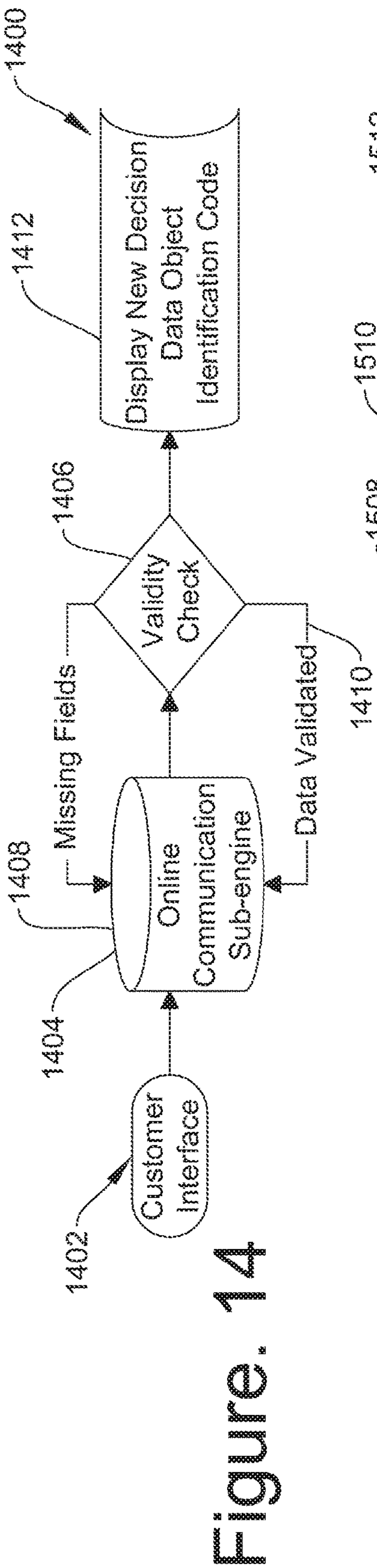
FIG. 14 depicts an example of a process for obtaining information for a request for access to one or more electronic services, in accordance with certain embodiments.
Figure 15:
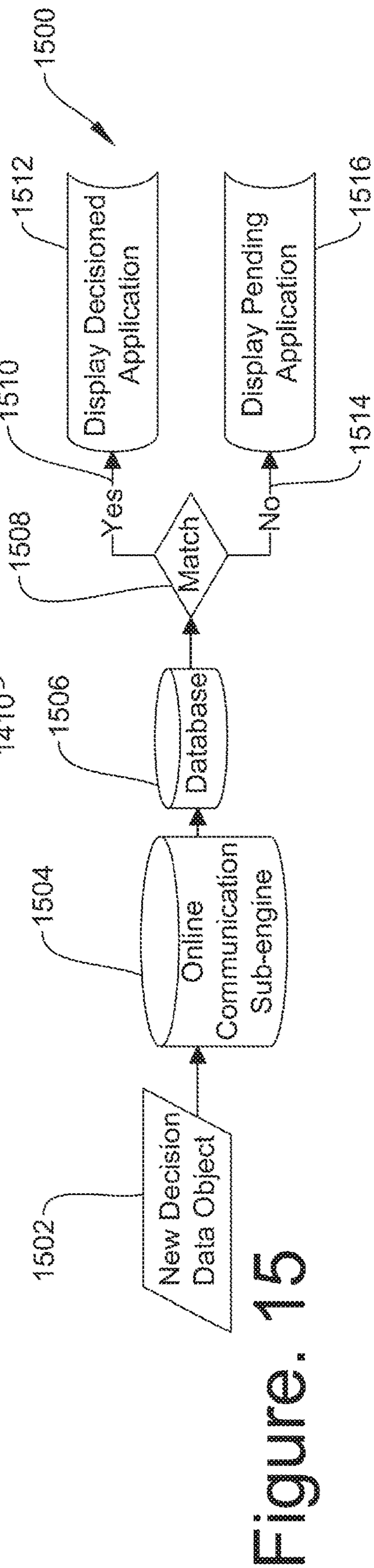
FIG. 15 depicts an example of a process for identifying a duplicate match among collected data, in accordance with certain embodiments.

For example, a client device can utilize the presentation/interface layer 204 to enter information to obtain a decision for a particular entity or set of entities requesting a particular electronic service (e.g., creation of a direct deposit account). Utilizing the presentation/interface layer 204, the client device can interface with the software development and decisioning platform 120 to use various templates and other components to obtain one or more decisions that impact whether the electronic service should be provided to the entity. At a very high level, one embodiment of such a solution includes a template for a decision data object for the electronic service. The presentation/interface layer 204 can provide a front-end user interface such as a predefined application to accept information from a user. In this example, information about one or more entities interested in accessing a particular electronic service can be input by one or more users 112*a-n* into one or more decision data objects displayed on an output device associated with one or more client devices 102*a-n*. Examples of processes that can be implemented by a presentation/interface layer 204 are shown in FIGS. 14 and 15.

The presentation/interface layer 204 can also extract decision-related data about a particular applicant from one or more data sources 170*a-n* (e.g., credit data obtained from a credit reporting agency). The presentation/interface layer 204 can interact with other layers or components of the software development and decisioning platform 120 to build analytical models based upon the extracted decision-related data information for one or more entities. Such analytical models can then be displayed for presentation and analysis to the user by the presentation/interface layer 204 (e.g., by providing one or more suitable interfaces to one or more client devices 102*a-n*). The software development and decisioning platform 120 can provide the presentation/interface layer 204 with decision information such as a decision as to which electronic services can be approved for use by one or more entities based on the extracted decision-related data and the analytical models. The presentation/interface layer 204 can provide an updated interface that displays the decision information at one or more client devices 102*a-n*.

In some embodiments, the presentation/interface layer 204 can provide a front-end interface for users 112*a-n* desiring workflow modeling. For example, the presentation/interface layer 204 can display a template for a predefined workflow model of accessing a particular electronic service including multiple process steps/people within a particular type of computing system that provides access to the electronic service. In some embodiments, the presentation/interface layer 204 can allow for greater control over a software development, process including the online ability to designate data sources, define decision rules, program decision algorithms implementing the decision rules, define the format of information outputted by decision algorithms, etc.

Figure 16:
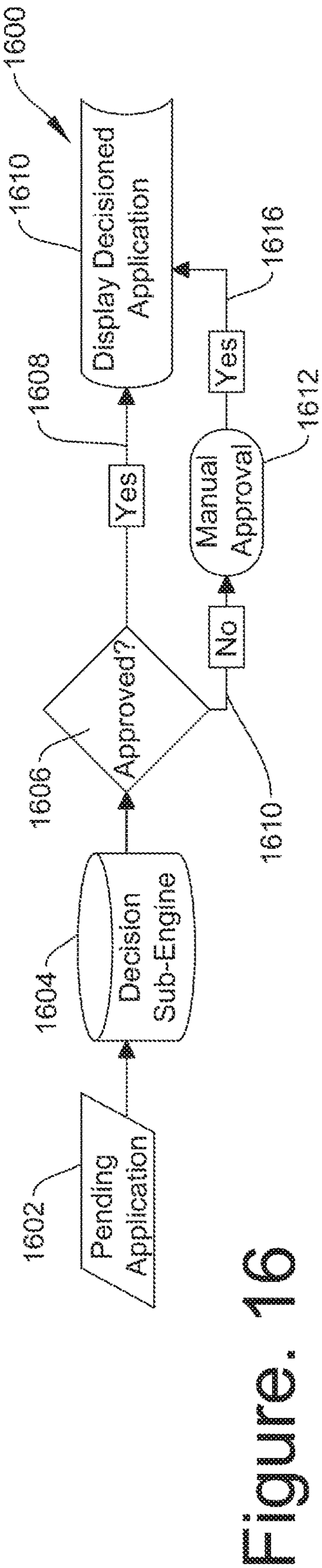
FIG. 16 depicts an example of a process for applying a decision algorithm to a particular data object, in accordance with certain embodiments.
Figure 17:
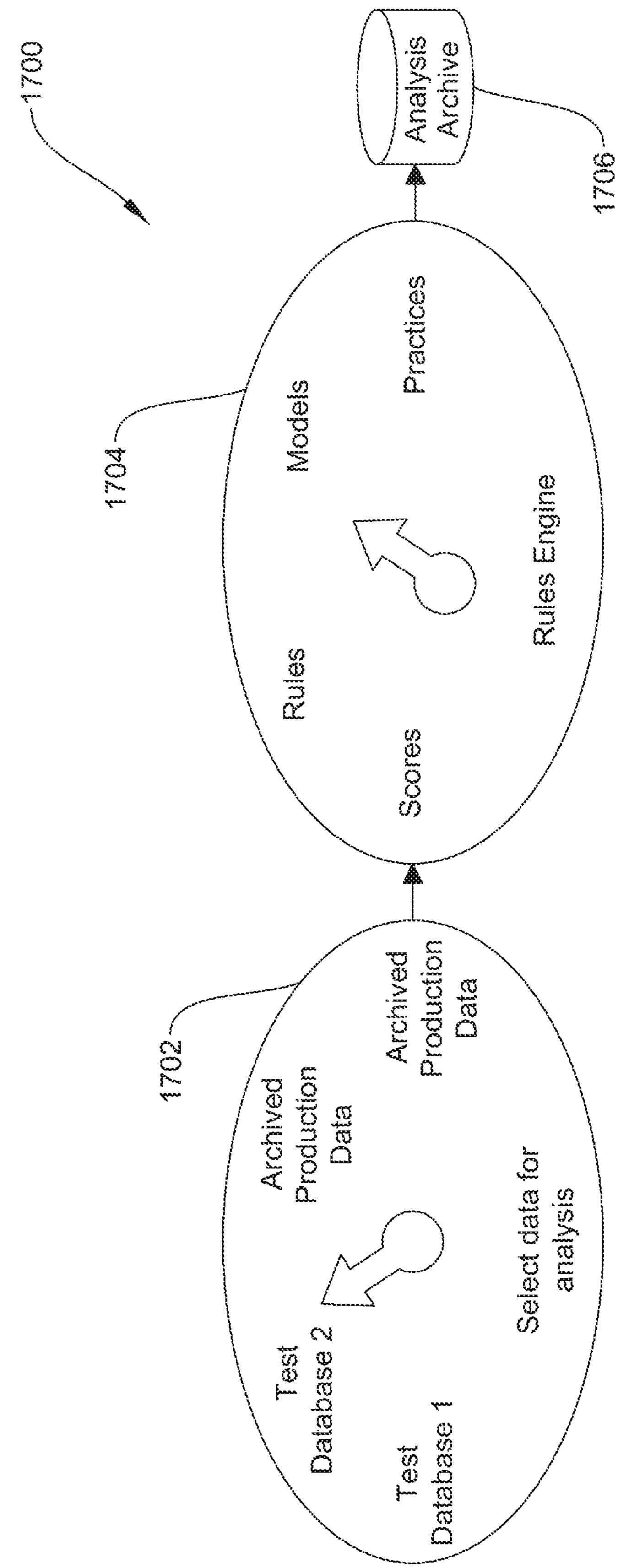
FIG. 17 depicts an example of a process for testing and updating a decision algorithm, in accordance with certain embodiments.

In the embodiment shown in FIG. 2, the software development and decisioning platform 120 can include, but is not limited to, a decision sub-engine 202. The decision sub-engine 202 can interact with the online communication sub-engine 200 to provide a customizable, point-of-presence solution uniquely capable of incorporating risk and marketing models, fraud and identity verification tools, third-party data sources, user-owned client intelligence and credit databases. The decision sub-engine 202 can incorporate a variety of risk assessment tools and data sources into an automated decisioning process, which can facilitate risk and marketing decisions made across various industries. An example of processes implemented by a decision sub-engine 202 are illustrated in FIGS. 16 and 17.

The decision sub-engine 202 can integrate analytics to segment and decision applications or accounts stored in a data source 170*a-n* based on risk and profitability levels, thus saving time in the decision-making process and providing consistency across units.

Figure 4:
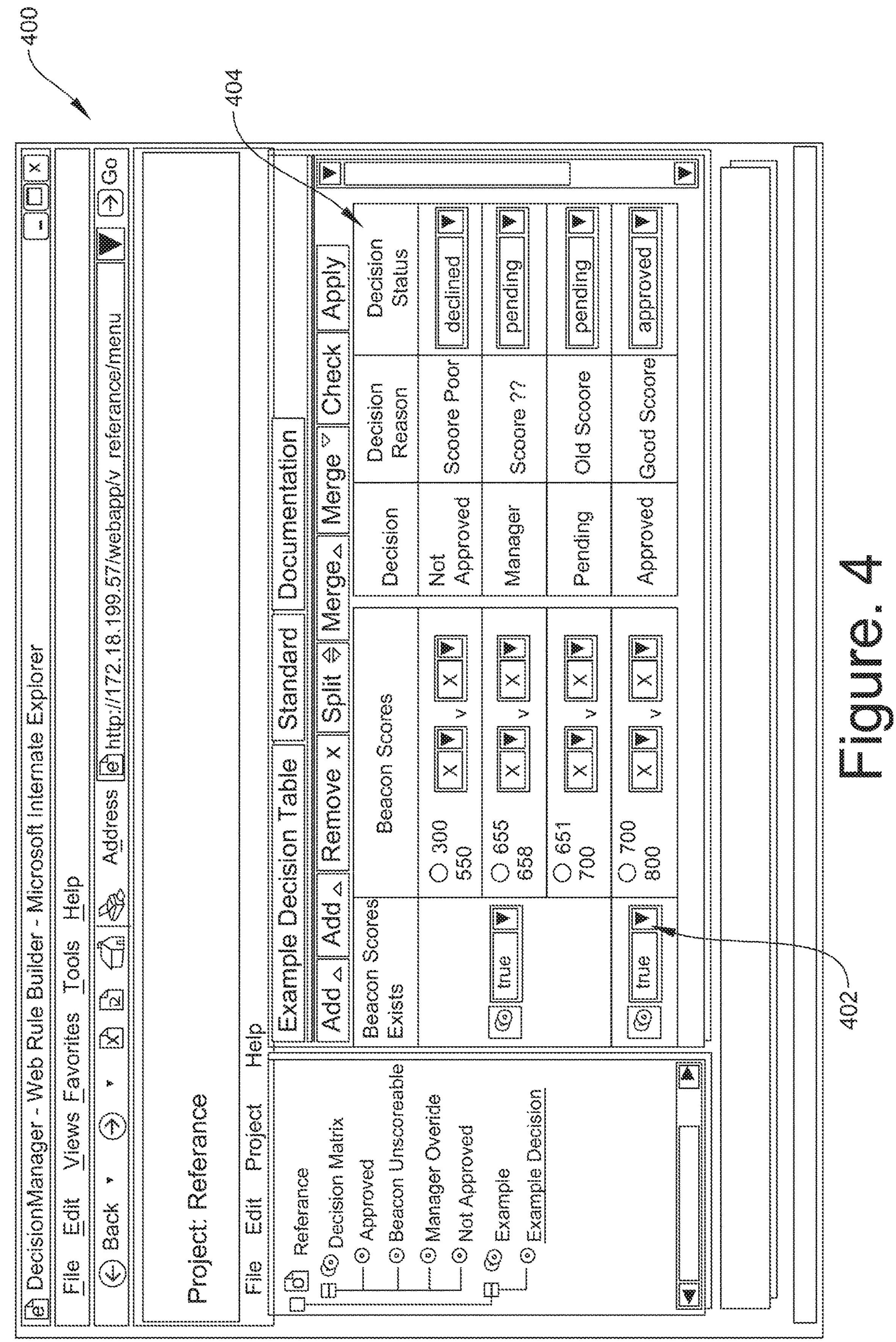
FIG. 4 depicts an example of a user interface that includes a rule display form for defining operations of a decision algorithm executed by a computing system, in accordance with certain embodiments.

In some embodiments, a user interface such as a rule display form 400 in FIG. 4 can be displayed by the decision sub-engine 202 via an output device associated with one or more client devices 102*a-n*. The rule display form 400 can assist the users 112*a-n* in creating and developing rules for the decision sub-engine 202 to apply to entity data collected by the online communication sub-engine 200. In the example shown, the rule display form 400 can provide a decision table matrix including various rule input devices 402 and decision information 404. Rule input devices can include, but are not limited to, radio buttons, pull-down menus (e.g., software version menus for selecting different decision algorithms) and data fields. Decision information can include, but is not limited to, existence of a Beacon™ score, Beacon™ score ranges, a decision, decision reason, and decision status.

The decision sub-engine 202 can include, but is not limited to, a data resource layer 206. The data resource layer 206 can provide integration and archival capabilities for all relevant entity and decision-related data in a suitable format that can be user-friendly and easily searched. Such data can also be stored by the data resource layer 206 for subsequent retrieval, analysis, and reporting. The data resource layer 206 can also allow such data to remain accessible by any suitable platform or operating system a particular one of the users 112*a-n* supports, such as platforms and operating systems operated by internal, external, third party, and legacy data sources and service providers. Users 112*a-n* and other entities (e.g., applicants) can benefit from real-time and/or immediate access to recent decision-related data, coupled with quick retrieval of data archived in compliance with regulatory timeframes. The data resource layer 206 can also accommodate varying data input and data output formats required when integrating with multiple data sources and third party service providers; thus, providing a suitable format for data storage that can be user-friendly and searched relatively easily. Such data can also be stored in a data storage device such as a data source 170*a-n* or an online service request database 172. In this manner, users 112*a-n* can obtain immediate access to recent records and quick retrieval of data. The data resource layer 206 can include functionality that allows other components of the software development and decisioning platform 120 to access and draw from multiple data sources 170*a-n*, and cause the data to be converted into form and format, which may be common, for further processing. The data sources 170*a-n* can be internal or external or both.

The data resource layer 206 operates with the sub-engines 200, 202, and other layers 204, 208, 210 to provide prepackaged access, format, and error handling to access data from internal and external data sources. In the example shown in FIG. 2, the data resource layer 206 can include respective interfaces 214 with the data sources 170*a-n* shown in FIG. 1. Such interfaces with data sources can include, but are not limited to, particular interfaces with internal data sources.

In some embodiments, the data resource layer 206 can operate as an application interface to provide user/business profile data from generic or specific data resources, such as consumer and/or commercial sources. Together, the data resource layer 206 and other components together can provide a solution where data needs to be obtained or otherwise retrieved from various data sources to facilitate application decisions in the context of the business value of the user.

In some embodiments, using the data resource layer 206 as an application interface can make application processing data source agnostic, and can enable provision of automated decisioning solutions using any or multiple data sources without need for custom coding efforts to obtain or retrieve data from data sources for each user solution. In some embodiments, a data resource layer 206 can accommodate varying data input and data output formats when integrating multiple data sources and third party service providers. The data resource layer 206 can automatically extract, transform, and load heterogeneous data fields from the one or more data sources 170*a-n,* minimizing or otherwise reducing the need for custom coded processing of such data.

According to a preferred embodiment, the data resource layer 206 can utilize a data transformation third-party tool such as eGate™ distributed by SeeBeyond.

The decision sub-engine 202 can also include, but is not limited to, a data analysis layer 208. The data analysis layer 208 can include, but is not limited to, an analytics services component 216, a complex decision component 218, a rules engine component 220, a model services component 222, and a format services component 224. The data analysis layer 208 can form inferences and conclusions which can be further processed and delivered by various components of the services layer 210. The data analysis layer 208 can enable any suitable type of simple or complex statistical analysis to be performed on data, such as raw data from a data source 170*a-n,* prior to the usage of the data for a decision regarding a particular application.

The data analysis layer 208 can be used with analytics, rules and knowledge, which may include criteria and attributes specified and arranged in an appropriate sequence based on communication with one or more client devices 102*a-n* using one or more graphical user interfaces. An "attribute" can include a date element that is a single data element from a set of entity data or an aggregation, calculation, or derivation of entity data to form a new data element. Furthermore, a "criteria," also known as "modeling criteria," can include one, two, or more attributes, or a set of attributes, and a set of instructions describing a logical expression involving the attributes therein used to segment or filter credit files to obtain a desired population of data.

In some embodiments, the data analysis layer forms inferences and conclusions that can be further processed and delivered by various components of the services layer. These include generating data describing the information, inferences and/or conclusions appropriately in communications, performing audits, controlling workflow, allowing trial runs, and managing documents reflecting reports of such information, inferences and/or conclusions and other services which may relate to the data, the entity extending credit, the subject of the diligence or other related matters or entities.

The analytics services component 216 can utilize the data provided by the data resource layer 206 and can process the data to provide analytics on the data. Generally, a result of an analysis of such data is the creation of one or more attributes. For example, attributes can be "Number of open bankcard trades on file with a balance greater than zero," "Age of oldest trade on file," "Aggregate balance of all open revolving accounts," "Number of 30 day and greater current delinquent ratings," "Propensity to buy information from user master files," "Psychographic codes like P$ycle," and "Marketing models based on non-credit related data." In this manner, the results of such analytics can be utilized in such a way that the results can be further analyzed or otherwise used by other components or services of the software development and decisioning platform 120. Additionally, provisioning results of the analytics (such as attributes and criteria) can minimize data processing by other components or services, which would otherwise face relatively greater processing inefficiencies that would result from these other components or services re-parsing data, re-calculating attributes, or both.

In some embodiments, client devices 102*a-n* can utilize an analytics services component 216 of a software development and decisioning platform 120 to define methods of automated decisioning to minimize risk. At the same time such methods can maximize the revenue potential, by not incorrectly rejecting applications that are within required risk parameters for a particular business. For purposes of automated decisioning based upon the entity data available for a particular customer, users 112*a-n* can define one or more attributes. In a simplified example, these attributes can be generated by using the data contained in a credit report associated with a particular applicant or set of applicants. These attributes can represent statistical aggregation or other various data elements. For example, an attribute can be a calculation of a total number of new trade lines in the last 2 years present in the credit report. This summation (statistical function) can be considered a proxy for how aggressive the applicant has been in establishing new lines of credit lately, whether that fact presents an unacceptable risk, or whether the risk indicates that the applicant's financial situation may be improving and is therefore acceptable.

In some embodiments, criteria and attributes can be intuitively defined, and the associated analytics may be accommodated with an automated criteria and attribute application engine such as an autopilot component, shown as 226 in FIG. 2, and further described in U.S. application Ser. No. 10/868,476, filed Jun. 14, 2004, entitled "SYSTEMS AND PROCESSES FOR AUTOMATED CRITERIA AND ATTRIBUTE GENERATION, SEARCHING, AUDITING AND REPORTING OF DATA," the contents of which are incorporated herein by reference. The autopilot component 226 can be integrated with a software development and decisioning platform 120 or can be a separate component in communication with the software development and decisioning platform 120. The autopilot component 226 can help reduce the burdensome and error-prone task of interpreting user specifications for a project manually into job control language. For instance, the autopilot component 226 can be used to develop query or search algorithms and language at a more intuitive and higher level with respect to an end user, as the end user can focus more on process flow and less on actually instantiating these ideas into computer-executable instructions or code (e.g., using a job control code or job control language).

The autopilot component 226 can also accomplish tasks such as improving the process flow and general cycle time of various processes. Often the client-requested criteria requires programming support to adjust, modify, enhance or extend existing selection criteria modules (record selection processes) to meet the specific client request. Some requests require programming to implement complete new modules. Creating and running jobs through the testing/validation cycles can be a lengthy process. All of the activities have been both time and system resource consuming as changes are made and iteratively tested.

Toward improving this situation, an autopilot component 226 can provide a workstation environment for the specification and testing of criteria and attributes on which the criteria is based. Resultant criteria and attributes can be utilized in a relatively high performance module that can be executed on multiple platforms and operating systems, such as personal computers, mainframes, parallel processing platforms, and supercomputers.

The autopilot component 226, similar to a programming integrated development environment such as Visual C++ for a programmer, can provide relatively easy to use point-and-click capability to enable users 112*a-n* to generate and process a custom request for criteria and/or attributes. In some embodiments, such criteria and attributes can be utilized for generating a prescreening list to filter data from one or more data sources such as 170*a-n*.

In one example, an autopilot component 226 can provide a mechanism for specifying custom criteria and attributes. Such criteria and attributes can then be utilized by the decision sub-engine 202 to automate a decisioning process. An example of custom criteria and attributes is a calculation of information, such as how many trade lines a particular applicant has where the amount due is over $1000, over due by 30 days from the past due date in last 6 months, or where trade lines were established (i.e. the credit line established) in the last 2 years. The attributes and criteria in this example can then be used as part of a decision process where users 112*a-n* may be inclined to offer only a restricted service to the applicant if this particular attribute is greater than a value of 5, representing a relatively higher degree of risk, as assessed by a risk manager associated with the user.

Figure 22:
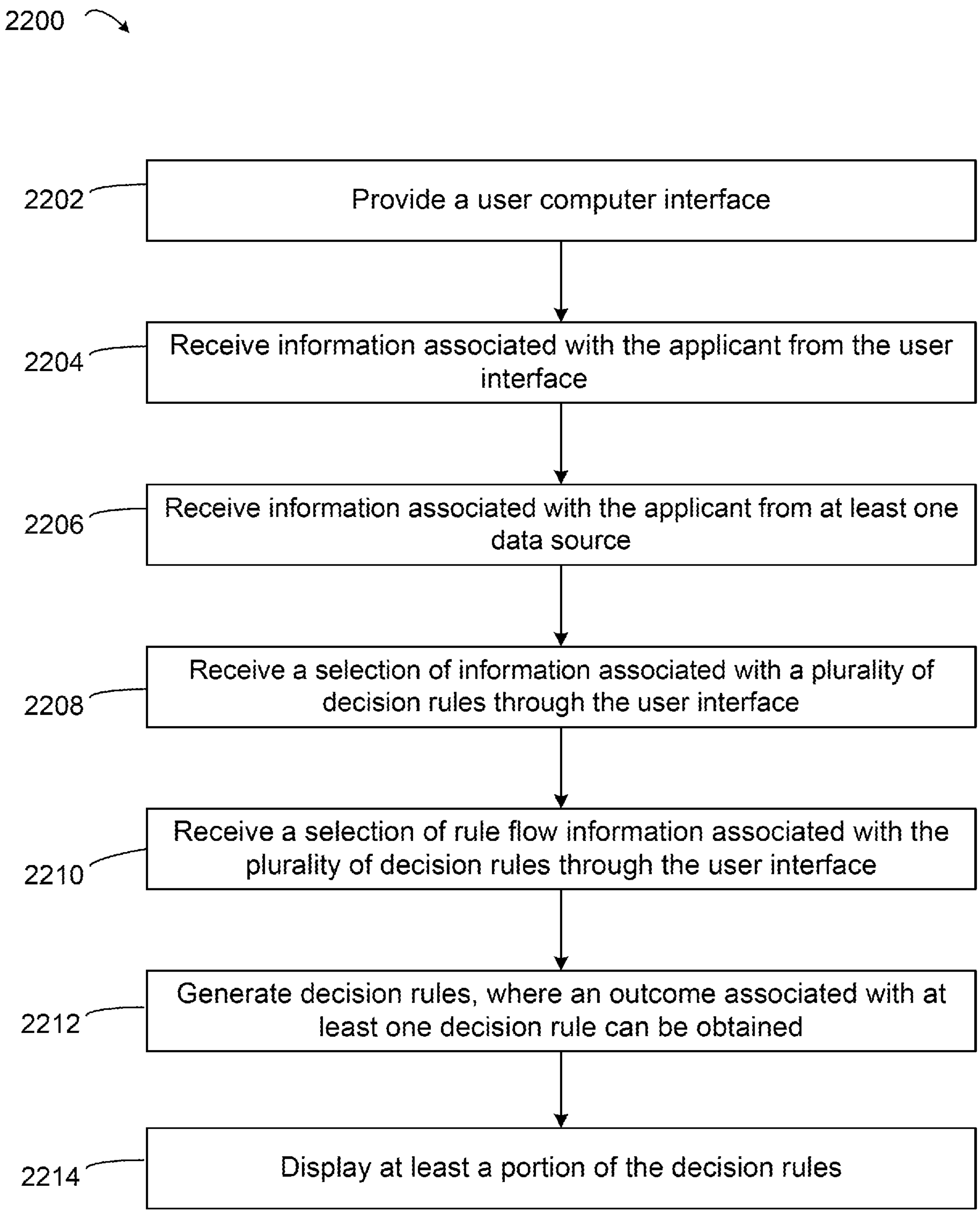
FIG. 22 depicts an example of a process for executing a decision algorithm with respect to one or more entities, in accordance with certain embodiments.

Examples of a decisioning process are shown in FIGS. 16, 17, and 22.

By way of further example, the above criteria and attributes can be applied to an example in which access to a particular electronic service (e.g., a direct deposit account) is provided. The following example is an attribute defined using an autopilot component 226:

Calculate Number of instances in which a Bankruptcy occurs (Chapter 7/11/13) in the last 2 years from current date and provide bankruptcy disposition type based upon following maps:

1=Filed if Disposition Code is C or D

2=Discharged if Disposition Code is A, F or L

3=Dismissed if Disposition Code is E, K or M

4=Voluntary if Disposition Code is V

5=Involuntary if Disposition Code is I

6=Non-Adjudicated if Disposition Code is N

7=Unknown

If Tradelines contain narrative code of BW, EV, HM, HN, IA or IL then do not report bankruptcy.

In some embodiments, attributes can also be defined taking into account the way a particular one of the users 112*a-n* does business, such as by using one or more predefined business templates. Other attributes and criteria can be defined taking into account aspects of a particular business, industry, or customers of the user. These and other attributes and criteria can be part of one or more predefined templates available to client devices 102*a-n*.

The data analysis layer 208 can also include, but is not limited to, a complex decision component 218. The complex decision component 218 can utilize the data provided by the data resource layer 206, analytics provided by the analytics services component 216, application parameters and decision rules set for a user specific application processing in order, among other things, to render an automated application decision. The complex decision component 218 can allow definition of application decision rules in near natural language constructs while simplifying the process of defining decision rules for use by a software development and decisioning platform 120. One aspect of the complex decision component 218 is the manner in which data from one or more data sources 170*a-n* can be made available to the decision sub-engine 202 to define decision rules. Various sets of attributes can also be made available for some or all data sources 170*a-n* in a standard way when the decision rules are created.

According to a preferred embodiment, a complex decision component 218 can utilize suitable software such as JRules™ distributed by ILOG, Inc. In additional or alternative embodiments, a complex decision component 218 can utilize JRules™ for service delivery coupled with one or more interfaces (standard or customized) to one or more data sources 170*a-n*.

Figure 5:
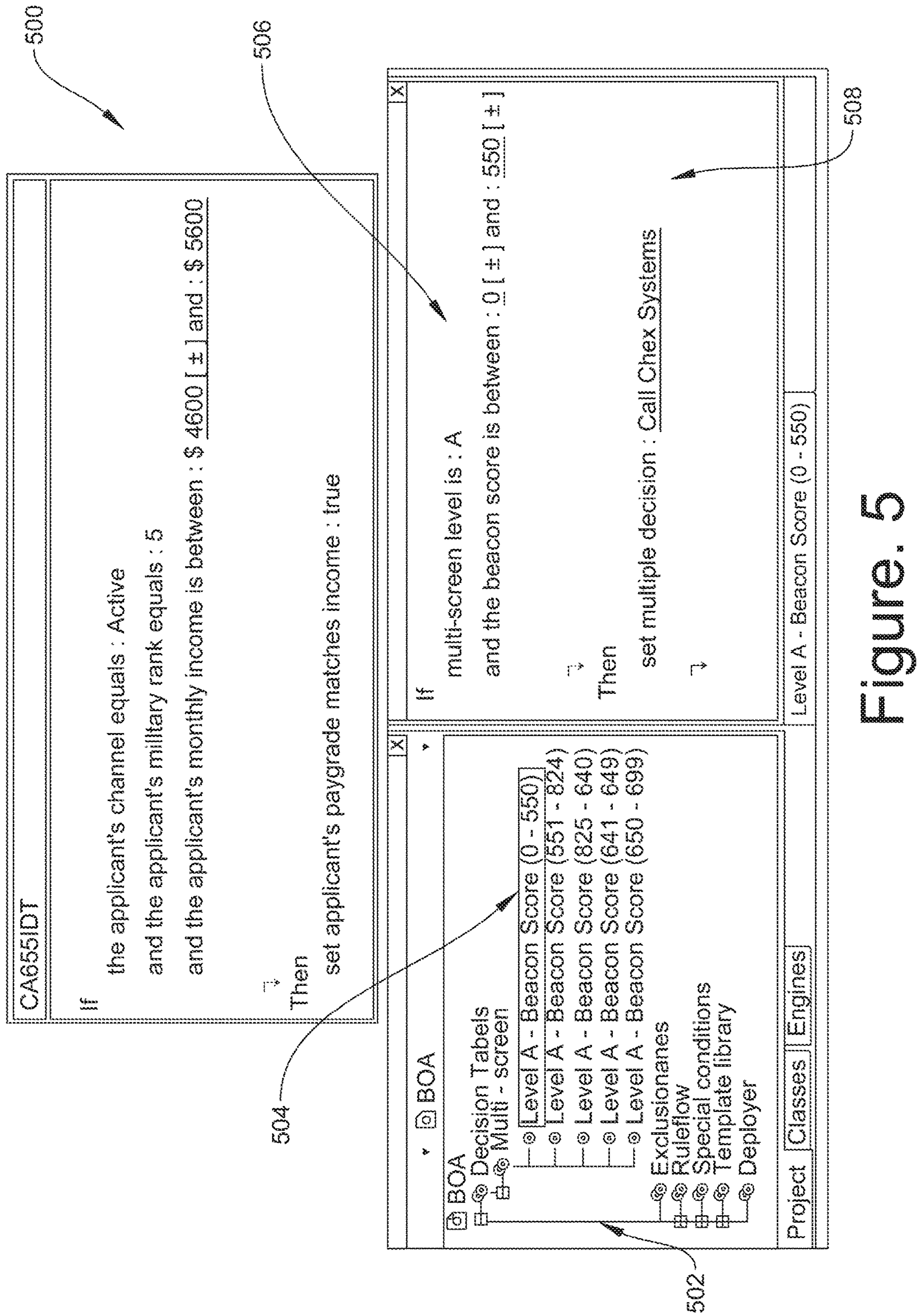
FIG. 5 depicts an example of a user interface for a complex decision component, in accordance with certain embodiments.

FIG. 5 shows an example of a user interface 500 associated with a complex decision component 218. In this example, client devices 102*a-n* can operate an input device such as a keyboard, mouse, or other input device associated with one or more client devices 102*a-n* to enter or otherwise select information to generate one or more decision rules such as "if" statements 502 and corresponding "then" statements 504. For example, the users 112*a-n* can set particular conditions and select desired criteria and/or attributes for a particular decision rule concerning an applicant with a Beacon™ score between the values of 0 and 550. The user interface 500 shown includes a tree-type menu 502 for the users 112*a-n* to select various decision rule-type information 504 such as decision tables, exclusionary rules, rule flows (e.g., different decision algorithms), special conditions, template libraries, and a deployer. An "if" statement 506 illustrated in the user interface 500 shown includes "If multi-screen level is 'A' and the Beacon™ score is between 0 and 550." A corresponding "then" statement 508 illustrated in the user interface 500 includes "'then' set multiple decision 'Call Chex Systems.'" Collectively, the "if" statement 506 and "then" statement 508 create a decision rule for the complex decision component 218 to apply to either or both entity data and data from one or more data sources 170*a-n*. The example user interface 500 shown in FIG. 5 can be utilized to develop the decision rule shown with suitable software such as JRule Builder™ distributed by ILOG, Inc.

Figure 6:
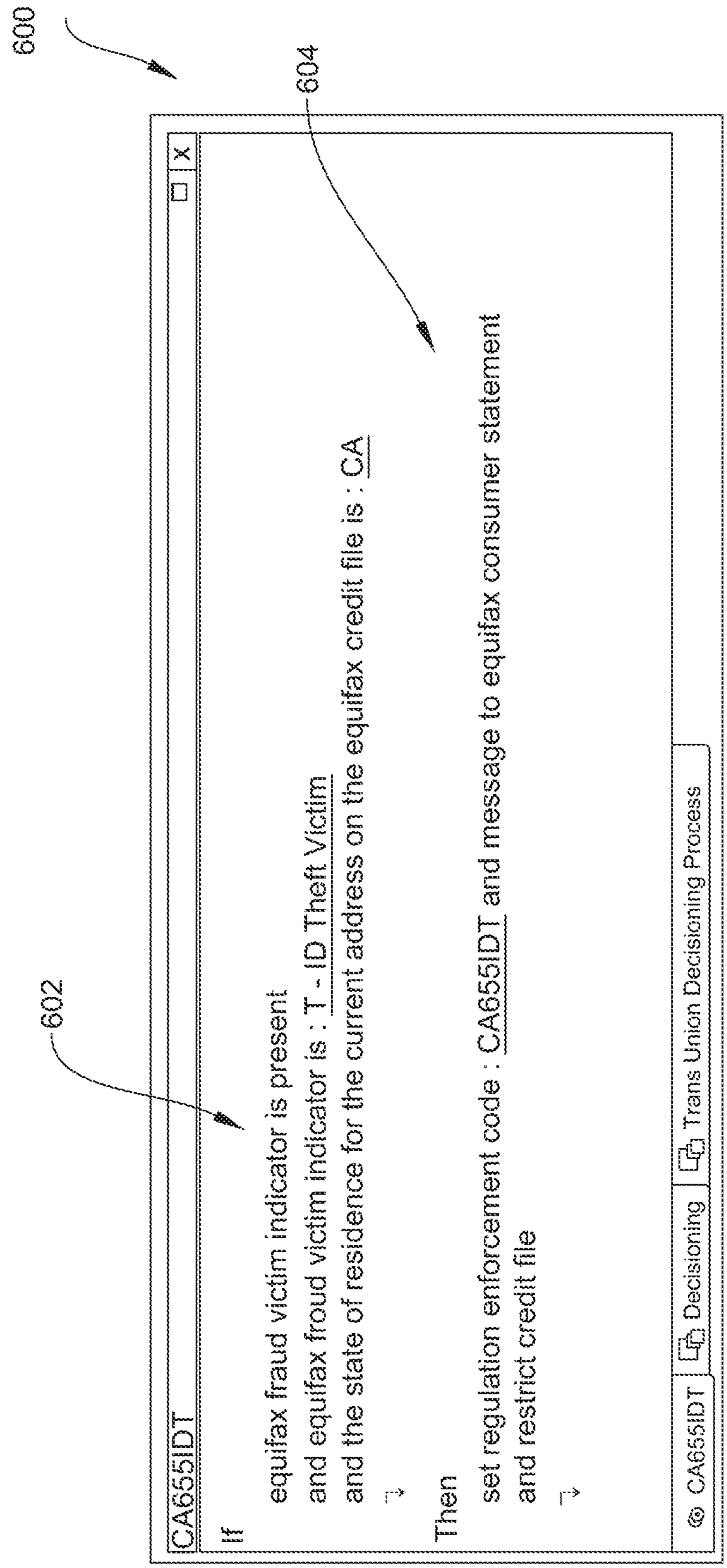
FIG. 6 depicts another example of a user interface for a complex decision component, in accordance with certain embodiments.

FIG. 6 also illustrates a user interface 600 associated with a complex decision component 218. In this example, client devices 102*a-n* can operate an input device such as a keyboard, mouse, or other input device associated with one or more client devices 102*a-n* to generate application decision rules in near natural language constructs such as "if" statements 602 and corresponding "then" statements 604. For example, users 112*a-n* can set particular conditions and select desired criteria and/or attributes for a particular set of applicants who were previously fraud victims in California. The user interface 600 shown includes "If" statements 602 such as "If . . . equifax fraud victim is present," "and Equifax fraud victim indicator is: T-ID Theft Victim," "and the state of residence for the current address on the Equifax file is: CA." Corresponding "Then" statements 604 shown include "Then . . . set regulation enforcement code: CA655IDT and message to Equifax consumer statement," "and restrict credit file."

Figure 7:
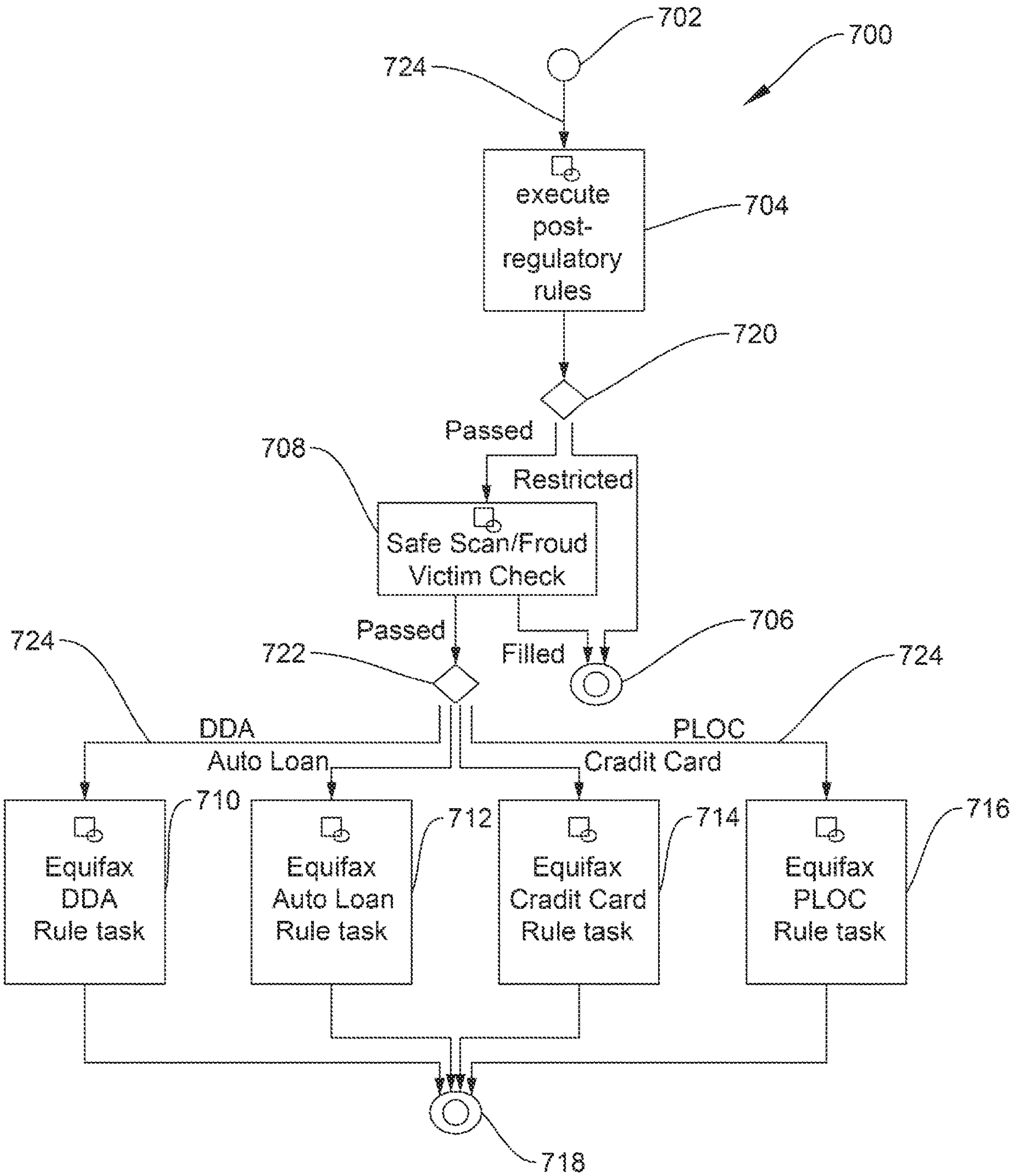
FIG. 7 depicts another example of a user interface for a complex decision component, in accordance with certain embodiments.

FIG. 7 also illustrates a user interface 700 associated with a complex decision component 218. In this example, client devices 102*a-n* can operate an input device such as a keyboard, mouse, or other input device associated with one or more client devices 102*a-n* to generate a decision flow for a set of decision rules, such as the rules generated in FIGS. 5 and 6. For example, client devices 102*a-n* can generate a series of flow elements 702, 704, 706, 708, 710, 712, 714, 716, 718 and decision blocks 720, 722 connected with flow path lines 724 to illustrate a desired decision flow for a set of decision rules. In the example shown, each flow element can represent access of a data source 170*a-n*, application of a rule, application of a set of rules, a product offering, or any combination of these or other functions capable of being performed by the decision sub-engine 202. By way of example, flow element 702 represents the start of the decision flow, flow element 704 represents "execute post-regulatory rules," flow element 708 represents "SafeScan/Fraud Victim Check," flow element 710 represents "Equifax DDA Rule task," flow element 712 represents "Equifax Auto Loan Rule task," flow element 714 represents "Equifax Credit Card Rule task," flow element 716 represents "Equifax PLOC rule task, and flow elements 706 and 718 each represent ends of the decision flow. Furthermore, decision block 720 represents a determination whether a particular set of entity data passes the rule set defined in flow element 704, and decision block 722 represents a determination whether the particular set of entity data passes the rule set defined in flow element 708. Other flow path elements can be used in other combinations and other functionality in accordance with various embodiments.

The data analysis layer 208 can also include, but is not limited to, a rules engine component 220. The rules engine component 220 can provide decision services. The use of the rules engine component 220 in systems and processes according to certain embodiments can be performed in such a way that a rules engine component 220 can be replaced with other implementations of a rules engine component 220 with relatively minimum integration efforts. One example of a rules engine component 220 can be a JRules™ rule engine distributed by ILOG, Inc., which can drive the decisioning described in the complex decision component 218 above.

The data analysis layer 208 can also include, but is not limited to, a model services component 222. The model services component 222 can be a special type of attribute, criteria and complex decision service where instead of rendering a decision, the model services component 222 can be used to produce a numeric score within a predefined range where various predefined bands of numbers within a band define a particular level of risk associated with an applicant based upon the model score using associated entity data.

The data analysis layer 208 can also include, but is not limited to, a format services component 224. The format services component 224 can format incoming data from various data sources to a common format that can be understood by the rules engine component 220 and other components that utilize data from the data sources 170*a-n*. In some embodiments, data input and data output format specifications can be provided by a format services component 224, and an associated visual mapping mechanism can be used to transform the data input to a data output. One example of a format services component 224 can be a data transformation component distributed by SeeBeyond.

In addition to formats required by various components of a software development and decisioning platform 120, data can also be formatted in a format desired by one of the users 112*a-n*. One embodiment of a format services component 224 can accommodate user-defined formats for data input and data output. Such user-defined formats and other predefined formats can be stored in a data storage device such as an online service request database 172.

Figure 8:
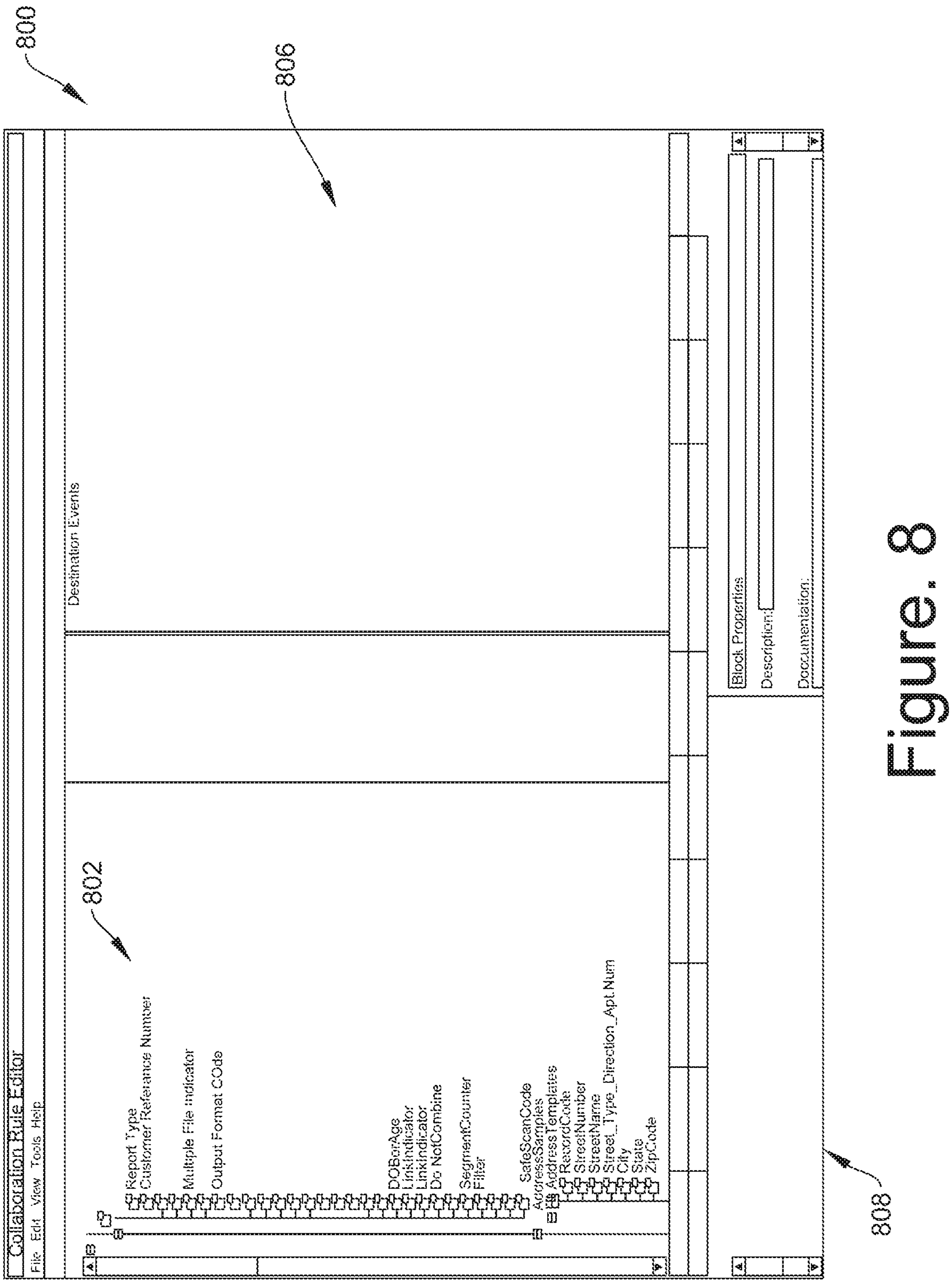
FIG. 8 depicts an example of a user interface generated by a format services component, in accordance with certain embodiments.

FIG. 8 depicts an example of a user interface 800 generated by a format services component 224. The user interface 800 shown provides a visual mapping of input data to corresponding output data. The user interface 800 can include a tree-type menu 802 for displaying (at one or more client devices 102*a-n*) various source events 804, associated destination events 806, and associated decision rules 808. Source events 804 can include, but are not limited to, an instruction provided by a data provider specific to processing a particular application, an applicant or user's identity information, and details related to a particular application. Destination events 806 can include, but are not limited to, machine format data ready for consumption by another engine or device, such as a decision engine, transaction engine, or a storage device. Decision rules 808 can include, but are not limited to, special parsing algorithms such as look-ahead fixed fielded data input, special conversion from string to date, integer, and sub-string inspection.

The decision sub-engine 202 can also include, but is not limited to, a services layer 210. The services layer 210 can include functionality to allow access to, use of, or mediation between the functionality of the data resource layer 206 and the data analysis layer 208, and between such functionality and external entities such as users 112*a-n,* and/or data sources 170*a-n*.

The services layer 210 can include, but is not limited to, an entity data component 228. The entity data component 228 can allow capture of business-specific details of one of the users 112*a-n* such as a user's decision rules and available data. The entity data component 228 can allow decision rules to be defined intuitively using a graphic user interface. In some embodiments, an entity data component 228 can provide an intuitive user interface. Such a user interface can permit capture of a user's relevant decision data object information in context of, for example, the application processing needs of the user. Each one of the users 112*a-n* may have specific definitions for the various business entities to be used for the application origination and decision. The entity data component 228 can allow capture of the user's relevant decision data object information without need for extensive programming efforts. Accurate capture of user's relevant decision data object information using the terminologies that the particular user is familiar with can increase user confidence and can minimize impedance between application processing requirements and solutions delivered to the user. One unique aspect of the entity data component 228 is a set of core implementations provided to expedite implementation of a solution and ability to capture a user's relevant decision data object information using nomenclature and relationships between the business entities as defined by the user. Use of the entity data component 228 can include delivery of core components using a standard tool to expedite implementation of solutions for common business entities. According to one embodiment, an entity data component 228 can be suitable software such as Transaction Logic Engine™ distributed by Versata, Inc.

In some embodiments, the users 112*a-n* communicate with the system 102 via client devices 102*a-n*. The software development and decisioning platform 120 is used to program decision algorithms using suitable software such as Rules Engine™ distributed by ILOG, Inc. The software development and decisioning platform 120 defines one or more algorithmic functions in a decision algorithm based on suitable data. Examples of suitable data include applicant information, including parameters such as whether an entity has already established a relationship with a service provider that to which the decision algorithm pertains, and entity attributes, such as analytical attributes derived from the applicant's entity data (e.g., a credit report) along with other statistical model scores to provide risk factors associated with the applicant. The software development and decisioning platform 120 can intuitively communicate this sort of information via a software development interface in which data is inputted or outputted in English-like language, near-natural language, or other plain or near plain language. This intuitive functionality can reduce any ambiguity that otherwise may be present if the decision logic were directly coded in a cryptic programming language that certain users (e.g., business people) could not decipher.

Any desired decision rules pertaining to certain decision data objects can be defined using, for example, a user interface 800 shown in FIG. 8. The user interface 800 shown can accept such data for a particular entity or otherwise create a layout of a new user interface to show such data pertaining to a user solution. The drag-and-drop functionality of the user interface 800 shown facilitates a user-friendly environment that provides a relatively easy to use set of tools. Basic navigation of the workflow of the user interface 800 shown can also be defined at least to some extent as desired. A particular form, template or other layout that has been defined can further be customized using any suitable web user interface editor tool.

Figure 9:
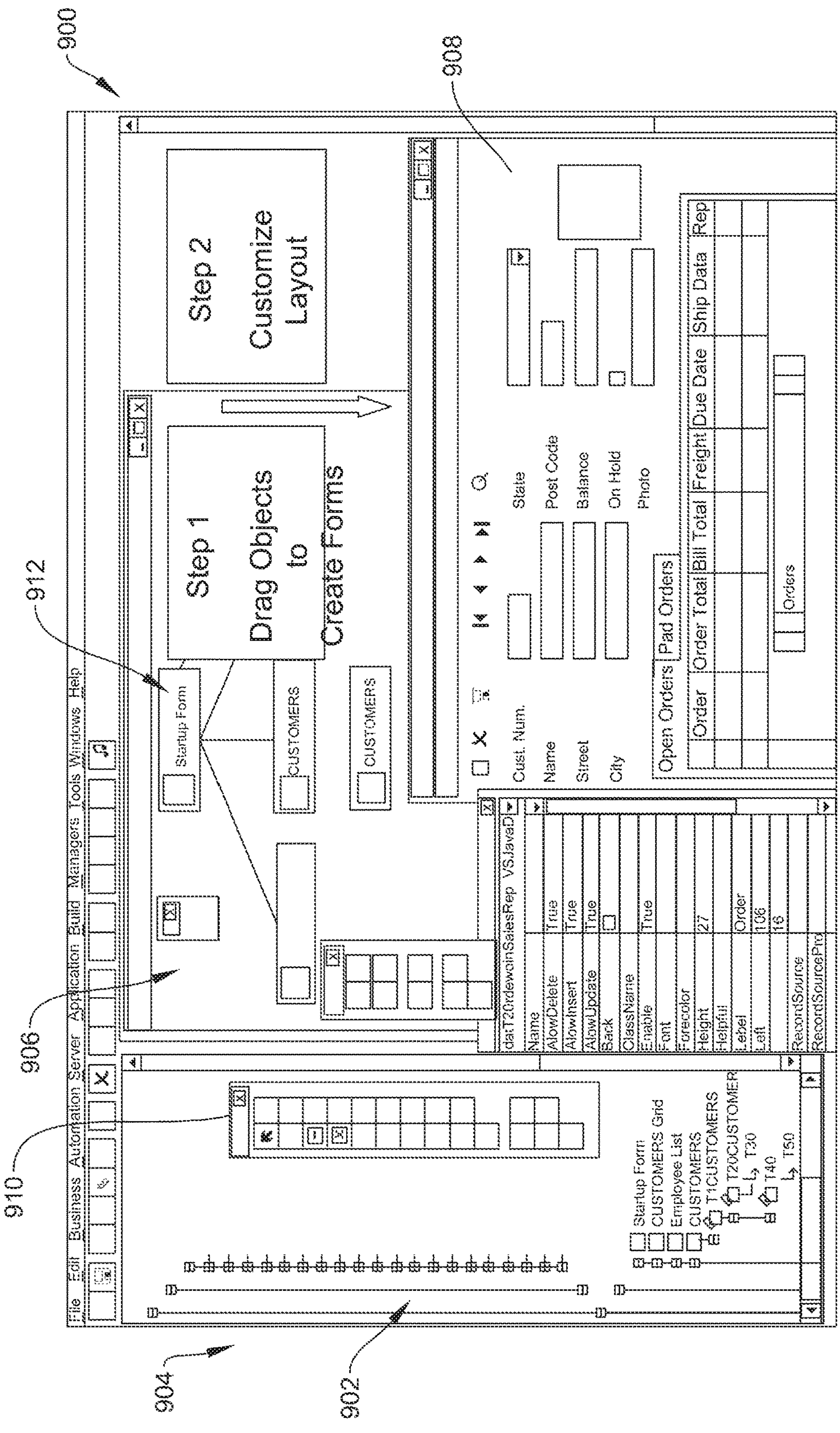
FIG. 9 depicts an example of a user interface for an entity data component, in accordance with certain embodiments.

For example, FIG. 9 illustrates a user interface 900 for an entity data component 228. In the example shown, one of the users 112*a-n* can define how to organize and collect user solution relevant decision data object information. Using a data input device such as a keyboard or a mouse, client devices 102*a-n* can select various objects 902 from a tree-type menu 904, drag one or more objects 902 to an associated workspace or field 906, and drop the objects 902 into the field 906 to automatically create one or more templates or forms 908. Various tools 910 associated with the user interface 900 can permit the user to create and modify a form, such as defining one or more data entry devices for a service request form, similar to 300 in FIG. 3. Such tools 910 can also permit a user to define a process flow within a form, such as a workflow 912 shown in the field 906. Forms, templates, process flow, workflows, and other outputs from the user interface 900 and/or the entity data component 228 can be stored in a data storage device such as an online service request database 172.

Figure 10:
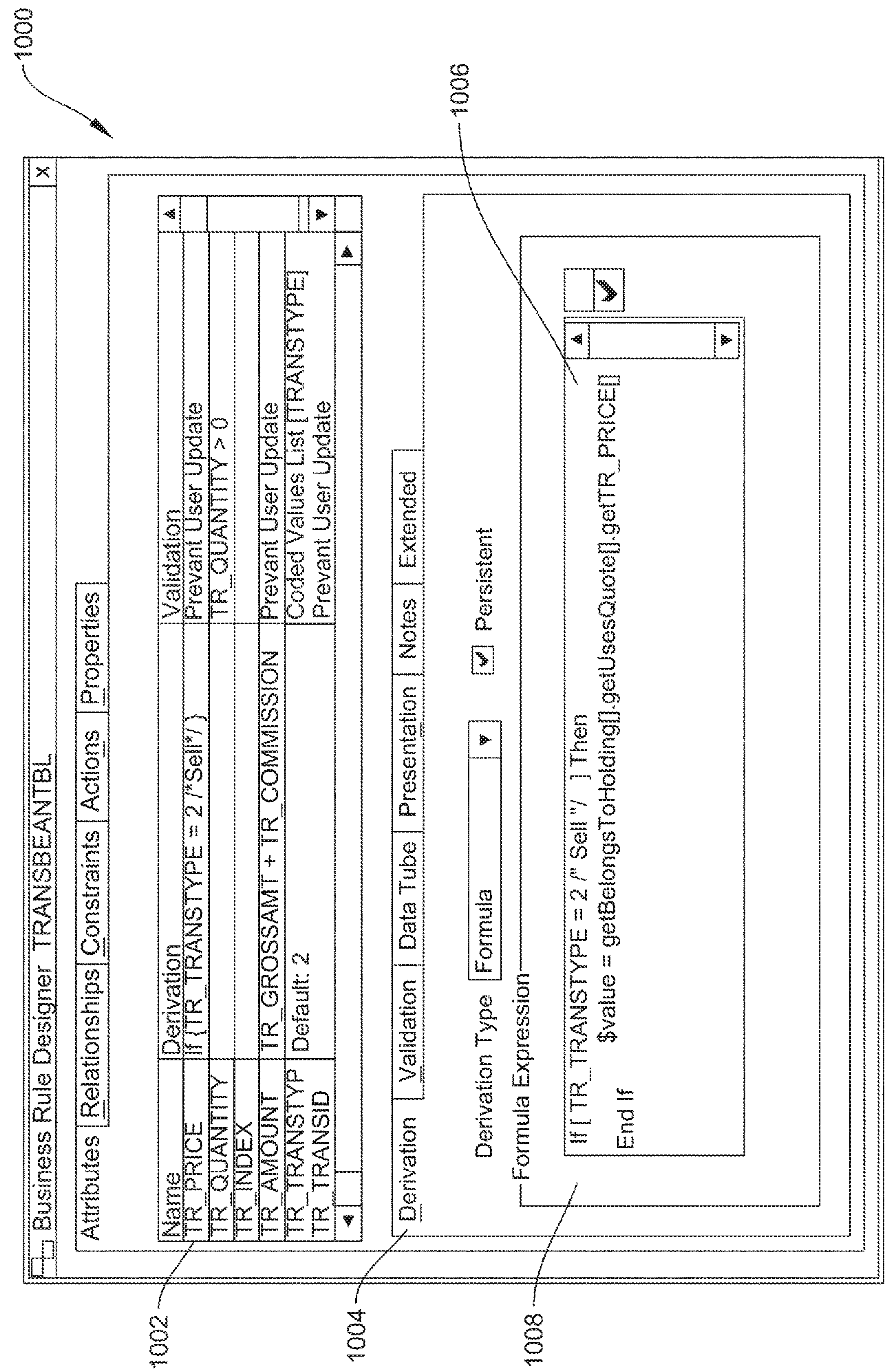
FIG. 10 depicts another example of a user interface for an entity data component, in accordance with certain embodiments.

FIG. 10 illustrates an example of a user interface 1000 for an entity data component 228. In the example shown, one of the users 112*a-n* can define one or more decision rules incorporating a user's available data. Using a data input device such as a keyboard or a mouse, client devices 102*a-n* can select one or more objects for attribute definition, such as the object "TR_PRICE" 1002. Other tools can be used to define other aspects of decision rules including, but not limited to, relationships, constraints, actions, and properties. In the example shown, a derivation tool 1004 can be utilized to modify or further define an object, such as defining the formula expression for the object "TR_PRICE" 1002. In a corresponding field 1006 or other data entry device, users 112*a-n* can review, edit, and approve the formula expression for a particular object. In the example shown, a corresponding formula expression 1008 for the object "TR_PRICE" 1002 can be displayed as, "If (TR_TRANS TYPE=2/*Sell*/) Then $value=getBelongsToHolding( ) getUsesQuote( ). get TR_PRICE( ) End If." Other types of formula expressions, derivations, and equations can be defined for objects in accordance with various embodiments.

Figure 19:
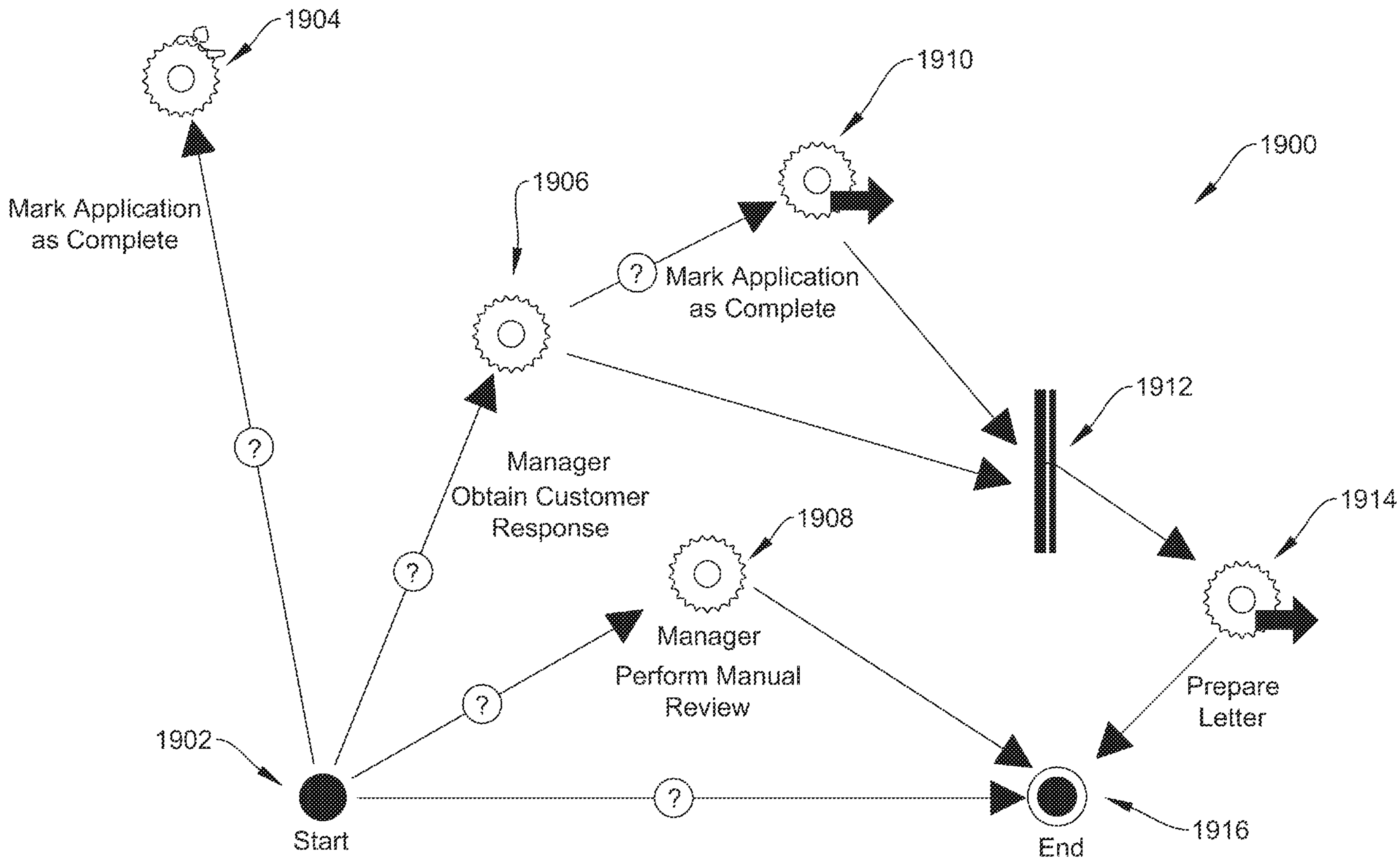
FIG. 19 depicts an example of a process diagram that can be implemented by a workflow component, in accordance with certain embodiments.
Figure 20:
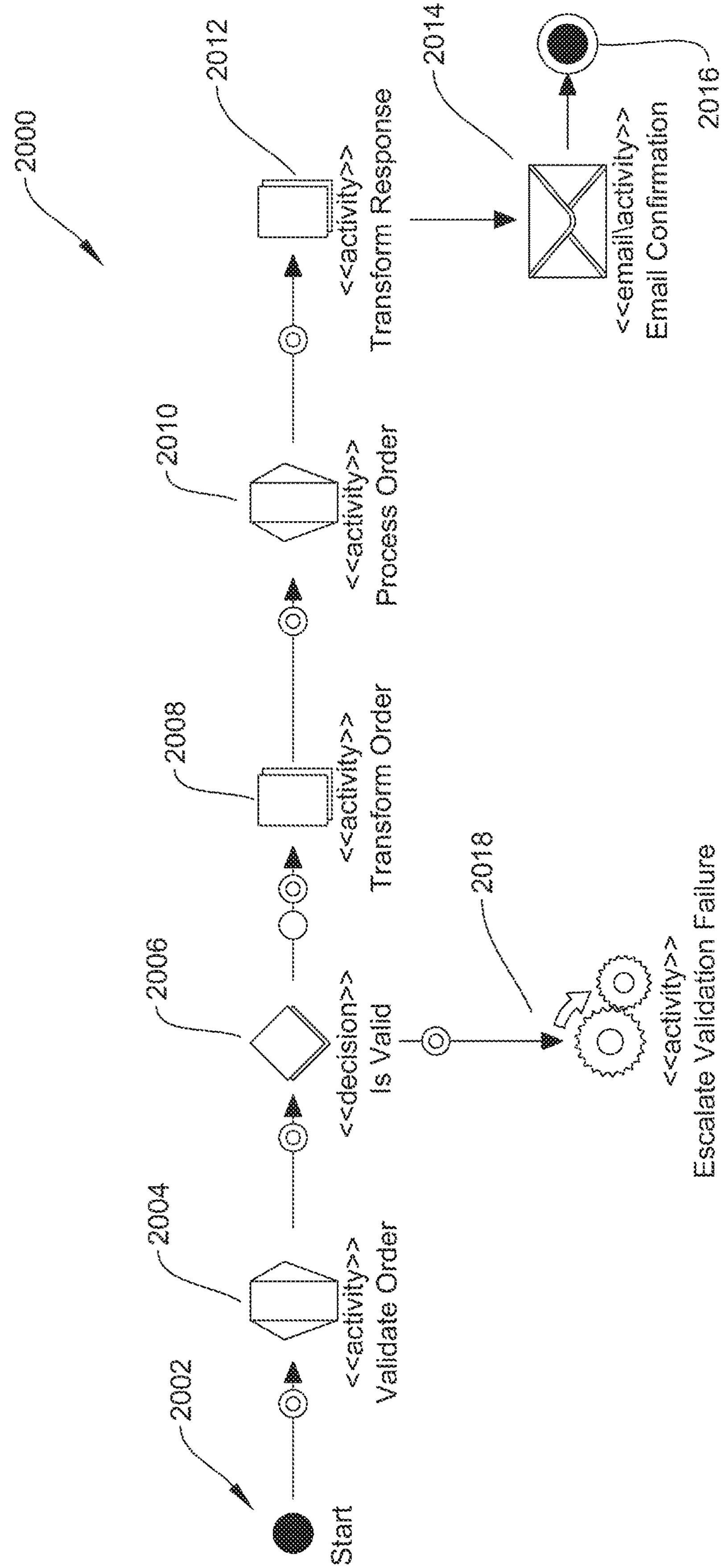
FIG. 20 depicts another example of a process diagram that can be implemented by a workflow component, in accordance with certain embodiments.
Figure 21:
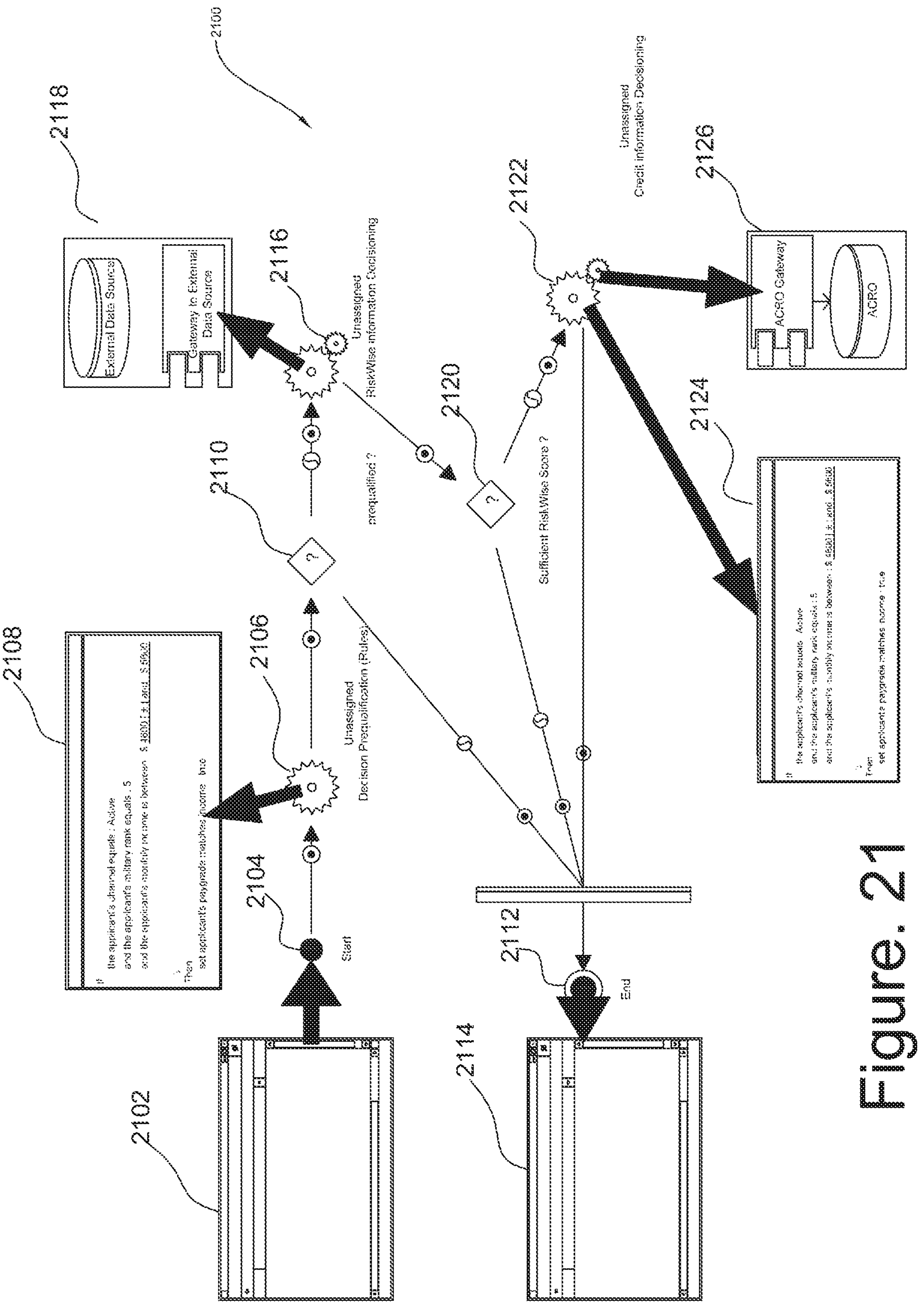
FIG. 21 depicts an example of a process for controlling a workflow between a user interface, a rules engine component, a data resource layer, and a data analysis layer, in accordance with certain embodiments.

FIGS. 19-21 illustrate processes implemented by an entity data component 228 for constructing one or more decision rules.

In some embodiments, rule changes can be controlled by the either, or both, users 112*a-n* and one or more system administrators. Depending on the level of control provided to users 112*a-n,* rule changes submitted via the entity data component 228 can be immediately implemented, or such changes can be submitted for approval to a system administrator.

The services layer 210 can also include, but is not limited to, a workflow component 230. The workflow component 230 can support workflow management, and in conjunction with the decision sub-engine 202, can provide queue management, work distribution (pull or push), work management, and other workflow services. For instance, a particular decision algorithm can be programmed for supporting certain operations of a system involving a client device. These operations can involve issues that arise prior to a decision or after the decision has been rendered. These operations can include, for example, data validation that ensures that a complete decision data object is available (e.g., information such as employment verification data is present) or that an incomplete decision data object can be supplemented with missing data (e.g., by verifying missing data as needed), transmission of notifications to one or more client devices indicating actions required by an entity (e.g., if completion of the application requires the applicant to be present at some specific location or requires involvement of some specific role players such as supervisors or branch managers), delaying notification of a decision algorithm's output to certain devices (e.g., notifying a client device associated with a financial institution using the software development and decisioning platform 120 prior to notifying a client device associated with an applicant described in one or more of the data sources 170*a-n*), transmitting follow-ups to entities, terminating transactions if no response is received from a client device a certain time period after notifying the client device of a decision algorithm's output, etc.

A software development and decisioning platform 120 can provide users 112*a-n* with tools for custom workflow implementation. Such tools can capture aspects of these workflow requirements and provide an environment to enact and execute these workflow models as part of application processing.

A workflow component 230 can also be used to define process flow to assemble all other services (data access from various data sources at different stages of application processing, rule processing with the available data, manual intervention for data entry, input processing and output formatting) together to facilitate application processing. The workflow component 230 can allow implementation of user specific workflow management requirements in the space of application origination and decision. In a preferred embodiment, a workflow component 230 can be implemented using either or both Process Logic Engine™ distributed by Versata, Inc. and JRules™ distributed by ILOG, Inc.

In some embodiments, the workflow component 230 can permit the decision sub-engine 202 to perform prescreen processing on transactions, one at a time. In this manner, users 112*a-n* can manage the selection of potential or current entities who may have been identified as potential candidates for access to an electronic service (e.g., pre-qualified applicant for a particular product or service).

FIGS. 19-21 described below illustrate process diagrams that can be generated and implemented by a workflow component 230.

The services layer 210 can include, but is not limited to, a security component 232. The security component 232 can provide a mechanism to control access of a particular user's solution assets using declarative roles-based access control. The implementation of the security component 232 can provide users 112*a-n* with the ability to self-manage access to implementation of a relevant decisioning system. The security component 232 can allow delegation to the user of management of system access, as desired by the user. The security component 232 can also allow the user to control access to some or all assets of a relevant decisioning system. The security component 232 can provide delegated and comprehensive security control based upon role-based access control.

The following Table 1 shows an example of role based access control implemented by a security component 232, for processing a service request form, such as 300 in FIG. 3:

TABLE 1

| Role Based Access Control | | | |
|---|---|---|---|
| Tab | Administrator | Supervisor | CSR |
| Credit Order | No | Yes | Yes |
| Credit Results | Yes | Yes | No |
| Override | No | Yes | No |
| Supervisor | Yes | Yes | No |

Another aspect of role based access control for a security component 232 is selective access to each form, application page, or webpage based on a particular user's role. If a particular one of the users 112*a-n* does not have access to a particular page, the page will not appear on an output device such as a display device associated with a client 112*a-n* that the particular one of the users 112*a-n* is operating. The role based access control can also be extended to functionality on a main menu or lower level sub-menus, commands, and features.

Other features for a security component 232 that can be integrated with functionality of the presentation/interface layer 204 include specific uniform resource locators (URLs) or Internet addresses. Each one of the users 112*a-n* can be issued a unique and distinct uniform resource locator to access the system. The URL can follow a standard naming convention and can include parameters that indicate the particular user and system name, such as www.interconnect.username.com/client/menu.

Another feature for a security component 232 is a login page that can be integrated with the presentation/interface layer 204. Each one of the users 112*a-n* can be required to enter a unique user ID and password prior to accessing functionality associated with the software development and decisioning platform 120. Error messages can be displayed for incorrect credentials, excessive login attempts (as defined based on communications with one or more client devices 102*a-n*), missing information, no user ID, and no email address on file. Functionality can be implemented for instances if a password has expired, then a "Reset Password" page can be displayed. If the user clicks the "e-mail my password" link, the "Password Sent" page displays if the user is using the correct password. If the user e-mail is not on file, a message to contact a system administrator can be displayed. In any event, once the user has successfully logged in, a "Message Center" page can be displayed, and can provide communications to the user from a system administrator.

Some or all of the functionality provided by the security component 232 and other components of the software development and decisioning platform 120 can cooperate to combat fraudulent application submission.

The services layer 210 can include, but is not limited to, a trialing/challenger component 234. The trialing/challenger component 234 is a software development engine that can provide or otherwise use a suitable computing environment for testing various strategies including alternative strategies for decision rules, scores, models and or processes, etc. The trialing/challenger component 234 can enable the user to establish one or more trials for strategies (e.g., formulas for criteria calculation, business parameters, product offerings, decision rules) and to perform statistical analysis of results produced as a result of the trials. The trialing/challenger component 234 can allow a user to establish any number of combinations and mechanisms to feed data to evaluate alternate strategies. In a simplified example, the trialing/challenger component 234 can enable users 112*a-n* to employ predefined and/or user-defined strategies for managing and maximizing the profitability of a portfolio. The trialing/challenger component 234 with all its potential is unique in the space of application processing and decisioning, because among other things, the trialing/challenger component 234 can place in the hands of the user, new and improved control of evaluating impact of various parameters to the risk evaluation of application processing.

In some embodiments, after implementation of decision rules, or if desired during initial build of the decision rules or at any other desired time, some users 112*a-n* may desire to compare different implementations in order to determine the best strategy and mechanism for minimizing the risk and at the same time maximizing the number of applications fulfilled. For such analysis, users 112*a-n* can build decision algorithms having various implementations of rules and other mechanisms. One or more computing systems execute the decision algorithms with respect to one or more data sources and thereby output various results. A software development and decisioning platform 120 can allow definition of gating criteria to send certain transactions and/or datasets to alternative or various rule structures or other mechanisms that have been developed, in order to evaluate the results and determine what the best way to proceed is.

In some embodiments, the trialing/challenger component 234 provides an intuitive tool that users 112*a-n* can use to evaluate the potential impact of employing new decision algorithms by testing various scoring algorithms, modeling algorithms, and other scenarios against off-line, archived data without impact on the production environment. For instance, if test data (e.g., off-line, archived data) is stored in a first database and production data is stored in a second database, a test mode that involves using the test data prevents a particular decision algorithm from being applied to the production data (e.g., using the decision sub-engine 202 to test the decision algorithm without impact on the production environment). For instance, users 112*a-n* may desire to test new decision algorithms that computationally implement certain strategies to determine if these decision algorithms provide acceptable results before deploying these decision algorithms in an environment that includes test data (e.g., by requesting the resources and time necessary to make a change in a production environment).

In additional or alternative embodiments, a database having test data is included in a test environment, which is a non-production version of an existing online environment. The software development and decisioning platform 120 or another suitable computing service can be used to create such a test environment from historical production data or other test data. The trialing/challenger component 234 can access the test environment to test one or more decision algorithms. The software development and decisioning platform 120 can be used to apply one or more changes to a tested algorithm. Results of the tests, modifications, or both are produced in real-time for review and evaluation. In this manner, users 112*a-n* can utilize the results to understand how a decision algorithm that implements a challenger strategy should be programmed in order to produce the desired results. Similarly, if a challenger strategy is not performing as expected, the trialing/challenger component 234 can allow for further testing of any changes that should be made to the relevant decision algorithm prior to deploying the decision algorithm (e.g., placing the decision algorithm into a production environment). For instance, users 112*a-n* can utilize testing results to understand how proposed changes to a score cutoff, score card model, or other practices may be impacted.

In additional or alternative embodiments, users 112*a-n* can utilize a trialing/challenger component 234 to create a "champion" strategy. A "champion" strategy is a decision algorithm used to decision the majority of a particular type of decision data object (for example, 85% of the applications may be processed under the champion rule set) and any number of challenger strategies (alternate rule sets) can be used to decision the remainder of the decision data objects (for example, 5% of the remaining applications use alternate rule set 1, 5% use alternate rule set 2, and 5% use alternate rule set 3). Each of the outcomes can be monitored via an associated data output component for a period of time to determine the feasibility of using the alternate rule sets. The user can use production data to monitor the impact to a portfolio under the challenger versus champion scenarios. The number of challenger scenarios is limited only by the user's ability to develop and manage these challengers in various environments, and of the diminishing effectiveness of using smaller and smaller percentages of the application data. In this manner, users 112*a-n* can determine the best strategies for managing and maximizing the profitability of portfolios.

The following scenarios represent examples of evaluations that can be performed with a trialing/challenger component 234. For example, a scenario involving any criteria calculation algorithm can evaluate changes to a criteria calculation algorithm to determine the impact to the decision. Furthermore, a scenario involving a user's business information can evaluate changes to the user's relevant decision data object information (different promotions, calling plans, redistribution of plans across zip codes etc.). Moreover, a scenario involving decision logic can evaluate changes to the decision logic from any of the following (or a combination thereof) decision rules, use of different criteria (including changed criteria calculation algorithm), changed score cut-off ranges (decision matrix). Finally, a combination of any of the above scenarios can evaluate the impact of changes to user's business by changing parameters such as business information and decision logic.

In additional or alternative embodiments, the trialing/challenger component 234 can also provide a framework for loading, implementing and executing a user's own scorecard or model used in the decisioning process. In some embodiments, the trialing/challenger component 234 can be a data agnostic system that enables the rapid setup of statistical models regardless of the data source or attribute requirements of the model. Some users 112*a-n* can leverage custom models in one or more decision processes. With the trialing/challenger component 234, the users 112*a-n* can deploy such models into production. The trialing/challenger component 234 can utilize a tool-based approach to code, and can deploy to production various mathematical calculations and decision trees typical to a statistical model.

A software development and decisioning platform 120 can operate in conjunction with and/or can be integrated with various backend components including, but not limited to, a letter writer component 236 and data output component 238. For example, in some embodiments, a letter writer component 236 and data output component 238 can operate as respective components of the services layer 210 shown in FIG. 2. The letter writer component 236 can provide the ability for users 112*a-n* to generate letters including, but not limited to, welcome, disclosure and declination letters. Users 112*a-n* can utilize a local print option feature of the system and/or leverage outsourced mail services provided by a service provider, such as Equifax, to handle both print and mail requirements. Field values can be determined by the user, and can be sent to a third-party company that provides letter generation capabilities so that letters can be created and sent to the user's clients. The timing of creating and sending the letters can be based on the user's needs. In some embodiments, there can be more than one letter type per users 112*a-n*. The following are examples of some of the templates available: welcome letter, auto decline letter, no reason—bureau letter, counter offer letter—with condition. The user can provide the templates for each letter type. The data fields can be populated at the desired placeholders in the letter template to create the final letter. In the instance of an applicant and co-applicant sharing the same address, then one letter can be sent to the address. If the applicant and co-applicant have different addresses, then separate letters can be sent to each address. If any deviation from the above is required, the letter writer component 236 can be customized to accommodate the user's specifications.

The data output component 238 can provide a range of reporting options from rudimentary to comprehensive. A variety of standard reports, seamless uploads to key reporting vendors, and data streams to users 112*a-n* who maintain proprietary or open reporting systems can be supported. The data output component 238 can also deliver reports online through a user interface to meet users' general needs. The user can select a desired report from drop-down menus, then select date range and output format. The desired report can be displayed real-time at the user's desktop. Reports can be made available in various formats including, but not limited to, portable document format (PDF), Microsoft Word™, Microsoft Excel™, or comma delimited formats. Such reports can be summary reports or industry-specific reports.

In some embodiments, users 112*a-n* such as a financial institution can desire that a report or information about the decision or diligence be prepared and sent a certain way. One example of such report being desirable include cases where an application was submitted using a real-time or online user interface or the decision is expected in real-time using the user interface. Another example of such report being desirable includes cases where the application processing request is sent using a communication protocol (e.g., socket connection, .NET connection, web services or other protocol) in which a decision is expected back as a response to the request via the same communication protocol. Another example of such report being desirable include cases where a batch file with a list of applications is sent, and users 112*a-n* may desire to receive a response back in batch file form while some other users 112*a-n* may desire access using a user interface to receive the decision result.

Examples of reports that can be generated by a data output component 238 can include, but are not limited to, credit risk reports providing metrics regarding the characteristics of a decision or a decision data object, a decision summary report showing aggregate summary information; a bureau summary report summarizing the total number of transactions sent to the data source; a decision detail report showing individual detail information for a specific transaction or group of transactions including data source accessed, criteria information, scores, offers, and data; score distribution reports; BEACON™ reports (by predefined point increments such as 10); Telco 98 score distribution reports; volume reports which provide metrics by logical units relevant to the user (region, channel, group, etc.) in logical calendar units (hour, day, week, month, etc.); weekly activity reports that provide volume metrics broken down by the day of the week (Monday-Sunday); hourly activity report that provide volume metrics broken down by the hour of the day; performance reports intended to measure user performance at the individual user level; current work items showing current work items that exist in the system; security reports intended to provide metrics regarding internal users logged on to the system; user detail report showing all current user details (names, phone numbers, user IDs, etc.), and date of last log in; user transaction activity report showing details by date about when users are submitting applications on the system.

In some embodiments, the data output component 238 can generate reports on a regular schedule, such as hourly, daily, weekly, monthly, yearly, or any other predefined period. In additional or alternative embodiments, the data output component 238 can generate customized reports such as ad hoc reports and data extracts that are specific to user requirements.

Users 112*a-n* can utilize a data output component 238 of a software development and decisioning platform 120 to employ any of a number of different mechanisms to receive results. If the application was submitted using a user interface, such as the service request form 300 in FIG. 3, then the preferred mechanism to receive response back can typically be through the same user interface. If the request was sent by another process, such as a system-to-system transaction, receiving results using the same process could be desirable. The format of such a transaction could be EDI formats, XML or many other industry formats. Formatting functionality can generate responsive information in the format preferred by the user. This feature can allow faster integration with the system since the user may not have to understand or change a relevant decisioning system to accommodate a specific format.

Figure 11:
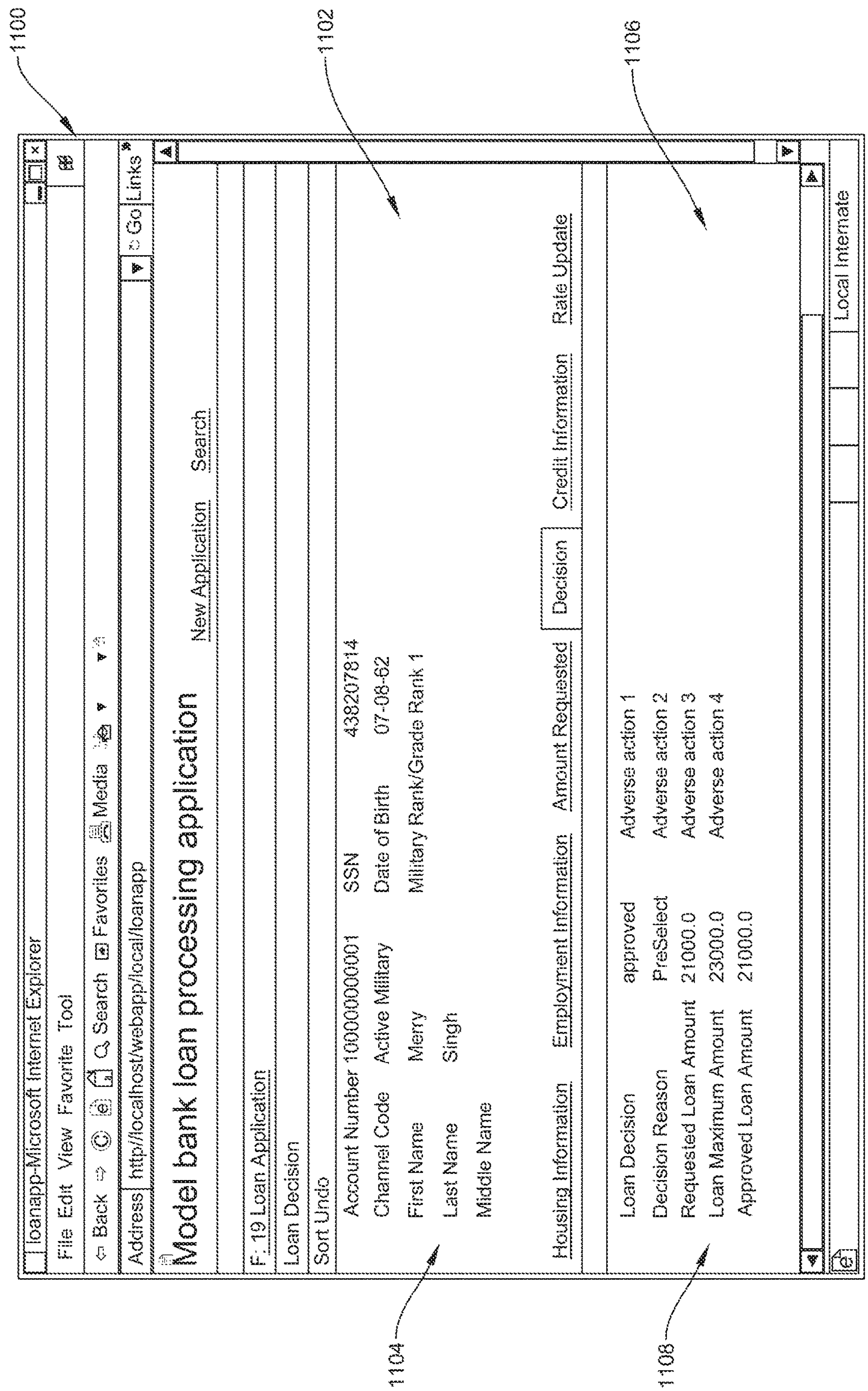
FIG. 11 depicts an example of a user interface for a data output component, in accordance with certain embodiments.

FIG. 11 illustrates a user interface 1100 that can be implemented by a data output component 238. The user interface 1100 shown displays one or more decisions generated by a decision sub-engine 202 based in part on at least information collected by the online communication sub-engine 200. In this example, a decision for a particular decision data object is displayed for a particular applicant entity, "Merry Singh." An upper portion 1102 of the user interface 1100 displays applicant information 1104 collected by, or otherwise received by, the online communication sub-engine 200, similar to the types of information collected in the service request form 300 of FIG. 3. A lower portion 1106 of the user interface 1100 displays decision information 1108, similar to the decision information 404 shown in FIG. 4, associated with the applicant information 1104. Decision information can include, but is not limited to, a load decision, decision reason, requested loan amount, loan maximum amount, and approved loan amount.

FIG. 12 illustrates another user interface 1200 that can be implemented by a data output component 238. The user interface 1200 shown displays a tabular interface with one or more decisions generated by a decision sub-engine 202 based in part on at least information collected by the online communication sub-engine 200. In this example, a decision based in part on an applicant's Beacon™ credit score is displayed. A leftmost portion 1202 of the user interface 1200 shown displays "BEACON '96" credit score range information 1204 such as "620≤v≤999," "550≤v≤578," "579≤v≤619,'"550≤v≤578," and "579≤v≤619." An adjacent column 1206 displays corresponding "Total Loan Amount" information 1208 such as "0≤v≤3500," and "3501≤v≤9999999" for the BEACON™ credit score range "620≤v≤999." Another adjacent column 1210 displays corresponding "Decision" information 1212 such as "Approve with 0% down" for the total loan amount information of "0≤v≤3500," and "Manual Review" for the total loan amount information of "3501≤v≤9999999." A column 1214 displays "Decision Status" information 1216 such as "approved" for the corresponding decision "Approve with 0% down," and "pending" for the corresponding decision "Manual Review." This and other information, including, but not limited to, credit scores, Beacon™ credit score ranges, total loan amounts, decisions, and decision status can be displayed or otherwise output in a tabular interface or any other user interface by a data output component 238. Such information can also be stored for retrieval, further analysis, or transmission in a data storage device such as an online service request database 172.

FIG. 13 illustrates another user interface 1300 that can be implemented by a data output component 238. The user interface 1300 shown displays a tabular interface with one or more decisions generated by a decision sub-engine 202 based in part on at least information collected by the online communication sub-engine 200. In this example, a decision based in part on an applicant's Beacon™ credit score is displayed with columns and information similar to columns 1210, 1214 and information 1212, 1216. Additional columns illustrated in this example are a leftmost column 1302 displaying corresponding "Multi-Screen 2.0" information 1304. The column adjacent to the left portion of the user interface 1300 shown include column 1306 displaying corresponding "DDA" information 1308, column 1310 displaying corresponding "PLOC" information 1312, and column 1314 displaying corresponding "Credit Card" information 1316. This and other information, including, but not limited to, credit scores, Beacon™ credit score ranges, total loan amounts, decisions, and decision status can be displayed or otherwise output in a tabular interface or any other user interface by a data output component 238. Such information can also be stored for retrieval, further analysis, or transmission in a data storage device such as an online service request database 172.

Processes

A software development and decisioning platform 120 can implement various processes and methods to process a decision data object and/or to generate a decision associated with the decision data object. The following processes and methods shown in FIGS. 14-22 can be implemented by some or all of the components of a software development and decisioning platform 120 in accordance with various embodiments.

FIG. 14 illustrates a process for collecting information for a request for access to one or more electronic services. In some embodiments, a decision data object and associated information are related to obtaining a decision for granting or denying an applicant request for access to one or more electronic services. In these and other embodiments, the example process 1400 shown in FIG. 14 can be implemented.

At block 1402, a user interface collects applicant information. In the embodiment shown in FIG. 14, a predefined form, such as the service request form 300 shown and described in FIG. 3, can be generated by an online communication sub-engine 200, and utilized to collect applicant information from users 112*a-n* viewing the service request form and operating a respective client device 102*a-n*. A client device can be used to enter information in the service request form 300 using an input device such as a keyboard and/or mouse associated with one or more client devices 102*a-n*. In some embodiments, the information is associated with an applicant requesting an electronic service (e.g., an online transaction involving credit), or is associated with a prospective entity to which access to an electronic service may be extended.

At block 1404, the applicant information is submitted to a decision data object engine for processing. In the embodiment shown in FIG. 14, an online communication sub-engine 200 receives the applicant information via the service request form 300 for processing.

At decision block 1406, a validity check is performed. In the embodiment shown in FIG. 14, the online communication sub-engine 200 can perform one or more validity checks on the applicant information. The online communication sub-engine 200 can perform a check whether information has been entered in any number of predefined required fields. For example, the online communication sub-engine 200 can permit certain fields to be associated with predefined requirements relative to availability, formatting, and content. In general, such fields will have to be validated relative to these issues. By way of further example, users 112*a-n* can designate required fields to be completed such as name, address, social security number, tax identification number, and product selection fields. In this example, such required fields must to be completed prior to processing the service request form 300.

As indicated by branch 1408, if the online communication sub-engine 200 determines that the applicant information in a service request form contains one or more missing required fields, then the process returns to block 1404. That is, if information has not been entered or is otherwise incomplete in one or more required fields, the online communication sub-engine 200 can prompt the user to enter or otherwise correct the information until the required fields contain valid information.

Furthermore, the online communication sub-engine 200 can perform a check whether particular information from users 112*a-n* is valid. The online communication sub-engine 200 can access one or more data sources 170*a-n,* compare user-entered information to predefined information or previously stored information, and perform one or more checking routines or methods.

As indicated by branch 1410, if the online communication sub-engine 200 determines that information is not valid, then the process 1400 returns to block 1404. That is, the online communication sub-engine 200 can review and edit one or more of the fields to validate information entered into the fields by the user. For example, the online communication sub-engine 200 can apply a particular user's editing rules before a form, such as service request form 300, is to be processed. In this manner, the online communication sub-engine 200 can check and validate user-entered or provided information against previously collected information stored in one or more data sources 170*a-n*. If information is not correctly entered in one or more fields, the online communication sub-engine 200 can utilize a correction routine or method to edit the information. If the information does not match information in one or more data sources 170*a-n,* the online communication sub-engine 200 can prompt the user to re-enter or otherwise provide correct or additional information in the service request form 300. The service request form 300 can be resubmitted and exchanged between the user and the online communication sub-engine 200 as many times as needed until the service request form 300 and associated information has been validated by the routines or methods, i.e. accepted by the online communication sub-engine 200.

At block 1412, a new decision data object identification code is associated with the validated application. In the example shown in FIG. 14, the online communication sub-engine 200 associates the validated application with a new decision data object identification code or a decision data object ID. The service request form, associated information, and new decision data object identification code or a decision data object ID can then be stored by the online communication sub-engine 200 in a data storage device such as an online service request database 172. In this manner, the service request form and associated information can be stored and subsequently tracked by its associated decision data object identification code or a decision data object identifier for later processing by other components of the software development and decisioning platform 120.

Once a request for a particular electronic service has been successfully submitted via a suitable request interface (e.g., a form for entering application data or data for another decision data object), the online communication sub-engine 200 can check for duplicate requests by matching elements of information in a current request form with elements of information from previously submitted requests stored in a data storage device, such as an online service request database 172. In many instances, users 112*a-n* want to ensure that requests being processed have not been previously processed by the software development and decisioning platform 120 or another associated component or entity. If a particular request is identified as a duplicate, the user has the option of either retracting the new request and utilizing a previously stored or otherwise processed application and any related decision information, or submitting the new request if information associated with an applicant has changed or is not a duplicate request. In this manner, duplicate applications can be identified relatively early in the application and decision process, and relevant results on previously decisioned applications can be returned to the user without having to re-process a decision data object for a particular applicant.

FIG. 15 illustrates a process 1500 for determining a duplicate match. In the embodiment shown in FIG. 15, a duplicate match can be determined by an online communication sub-engine 200 comparing a new application and associated applicant information with a previously stored application and its respective associated applicant information.

The process 1500 begins at block 1502, in which a new decision data object identifier is received. In this embodiment, the online communication sub-engine 200 receives the new decision data object identifier, or otherwise generates the new identification ID when a new application is validated, such as in the process 1400 shown and described in FIG. 14.

At block 1504, the new application, associated applicant information, and new decision data object identifier are called upon by or otherwise transmitted to the online communication sub-engine 200 for processing. In the embodiment shown in FIG. 15, the online communication sub-engine 200 can determine one or more elements such as fields in a service request form 300 to compare with previously stored elements stored in a database such as an online service request database 172.

At block 1506, the online communication sub-engine 200 calls to a database such as an online service request database 172 for previously stored elements.

At decision block 1508, a determination is made whether a match exists between any element in the new application and previously stored elements in the database. That is, the online communication sub-engine 200 can compare the new application and associated applicant information with previously stored applications and associated applicant information stored in the online service request database 172. The online communication sub-engine 200 can determine whether a duplicate match exists based on determining whether at least some of the data stored in the online service request database 172 is equal to or refers to the same entity as data from the new application and associated applicant information.

As indicated by branch 1510, if a duplicate match exists, then the "YES—duplicate" branch is followed to block 1512. In block 1512, the previously stored application and associated decision can be called upon by the online communication sub-engine 200 and displayed for the user. The user can be notified that a duplicate match exists, and the user can utilize the previously stored application and associated decision information can be displayed. In some embodiments, the user can be provided with an option to either retract the new application and utilize the previously stored application and any related decision information, or continue to submit the new application if information associated with an applicant has changed.

Returning to decision block 1508, and indicated by branch 1514, if a duplicate match does not exist, then the "NO—new" branch is followed to block 1516. In block 1516, the new application and associated applicant information can be transmitted for further processing by other components of the software development and decisioning platform 120. The user can be notified that the new application does not have a duplicate match, and therefore the status of the new application can be changed to "pending" application.

Once a decision data object has been accepted for processing by the online communication sub-engine 200 and designated as "pending," the application can be transmitted to the decision sub-engine 202 for processing and decisioning. The software development and decisioning platform 120 can perform pre-processing calculations and can process any decision rules established by users 112*a-n* for a particular application or project. Depending on predefined process flows such as those dependent on particular elements of the application, particular process elements can be executed with respect to the application while the application is pending. For example, information such as whether a particular applicant meets minimum income or residency standards can trigger the application of a particular set of user-specific decision rules for the purpose of creating one or more work items or rendering a workflow decision. In another example, the application may also be in a workflow awaiting action from a user's employee or agent to change state and continue the process. For example, the application is submitted and assigned to a manual review work list due to the absence of one or more files including entity information (e.g., a credit file). In any event, once the application is in a decisioned state, the application evaluation is complete and a decision can be rendered. In some embodiments, the decision can be a direct answer to a product or service requested by an applicant and can represent an end state of the application evaluation process. In additional or alternative embodiments, the decision can be a direct answer to a product or service requested by users 112*a-n* for offering to a potential applicant. After the decisioning process, the decision and associated information can be transmitted to or otherwise handled by post-processing functions provided by, or in conjunction with, the software development and decisioning platform 120. Such functions can include the preparation of reports, letters, data dumps, etc. When no workflow activities remain, the application can be considered in a "completed" state.

FIG. 16 illustrates a process 1600 for decisioning a decision data object. In the embodiment shown in FIG. 16, a decision can be determined by a decision sub-engine 202 utilizing applicant information associated with a new application and associated information in one or more data sources 170*a-n*.

The process 1600 begins at block 1602, in which a pending application is called upon by or otherwise transmitted to the decision sub-engine 202 for processing.

At block 1604, the decision sub-engine 202 receives the pending application.

At decision block 1606, a determination is made whether the pending application is approved. Various decision processes, methods, routines can be applied to the pending application to determine whether to approve the pending application. Examples of methods that can be used with automated technologies are described and shown as, but not limited to, 402 and 404 depicted in FIG. 4, 500, 506, 508 depicted in FIGS. 5, 602 and 604 depicted in FIG. 6, 1200 depicted in FIG. 12, and 1300 depicted in FIG. 13. Examples of other decision processes, methods, routines are further described in FIGS. 22-24.

If the pending application is approved, then the "YES" branch 1408 is followed to block 1610. In block 1610, a decisioned application can be displayed or otherwise output to client devices 102*a-n*. In the embodiment shown in FIG. 16, client devices 102*a-n* can be notified via a display device that that the pending application has been decisioned. A decision and associated decision information can be displayed to the user via a user interface, such as the user interfaces 1200, 1300 shown and described in FIGS. 12 and 13.

After block 1610, the process 1600 ends.

Returning to decision block 1606, if the pending application is not approved, then the "NO" branch 1612 is followed to block 1614. In block 1614, a pending application can be granted manual approval by transmitting the pending application to one or more client devices 102*a-n* associated with one or more of appropriate users 112*a-n* (e.g., a user having administrator privileges). If the pending application is granted manual approval, then the "YES" branch 1616 is followed to block 1610.

Block 1610 is described above.

Returning to block 1614, if the pending application is not granted manual approval, the pending application is denied, and a corresponding notification can be transmitted to the user regarding the denied application.

Prior to, or after, a decision is rendered for a particular form, application, request, or account, users 112*a-n* can utilize the decision sub-engine 202 to test various strategies for scores, models, and processes. In some embodiments, a trialing/challenger component 234 of a decision sub-engine 202 can be utilized to test a challenger strategy for a particular application. The user can then compare the challenger strategy to the current or "champion" strategy, and determine whether to modify or replace the current or "champion" strategy based in part on the analysis of the comparison.

FIG. 17 illustrates a process 1700 that can be implemented by the trialing/challenger component 234. In FIG. 17, the process 1700 begins at block 1702. In block 1702, one or more data sources 170*a-n* are selected for analysis. For example, a data source such as "Test Database 2" can be selected by the user (e.g., via a source-selection input at a mode selection element in a menu within an interface). Other examples of data sources that can be selected include, but are not limited to, test database 1, and archived production data.

At block 1704, a particular rule set (e.g., a set of rules implemented via a decision algorithm) is selected for implementation with the selected data source. For example, a rule set such as "Models" can be selected by the user (e.g., via a software version selection input at a software version menu element in a menu within an interface). Other examples of rules sets that can be selected include, but are not limited to, scores, rules, and practices.

At block 1706, an outcome or trial decision is stored. For example, an outcome or trial decision can be stored in a data storage device such as an analysis archive or online service request database 172. The outcome or trial decision can be compared to a "champion" or current strategy, and the user can then determine whether to alter the "champion" or current strategy or replace the "champion" or current strategy with a new rule set, or "challenger" strategy.

After block 1706, the process 1700 ends.

Figure 18:
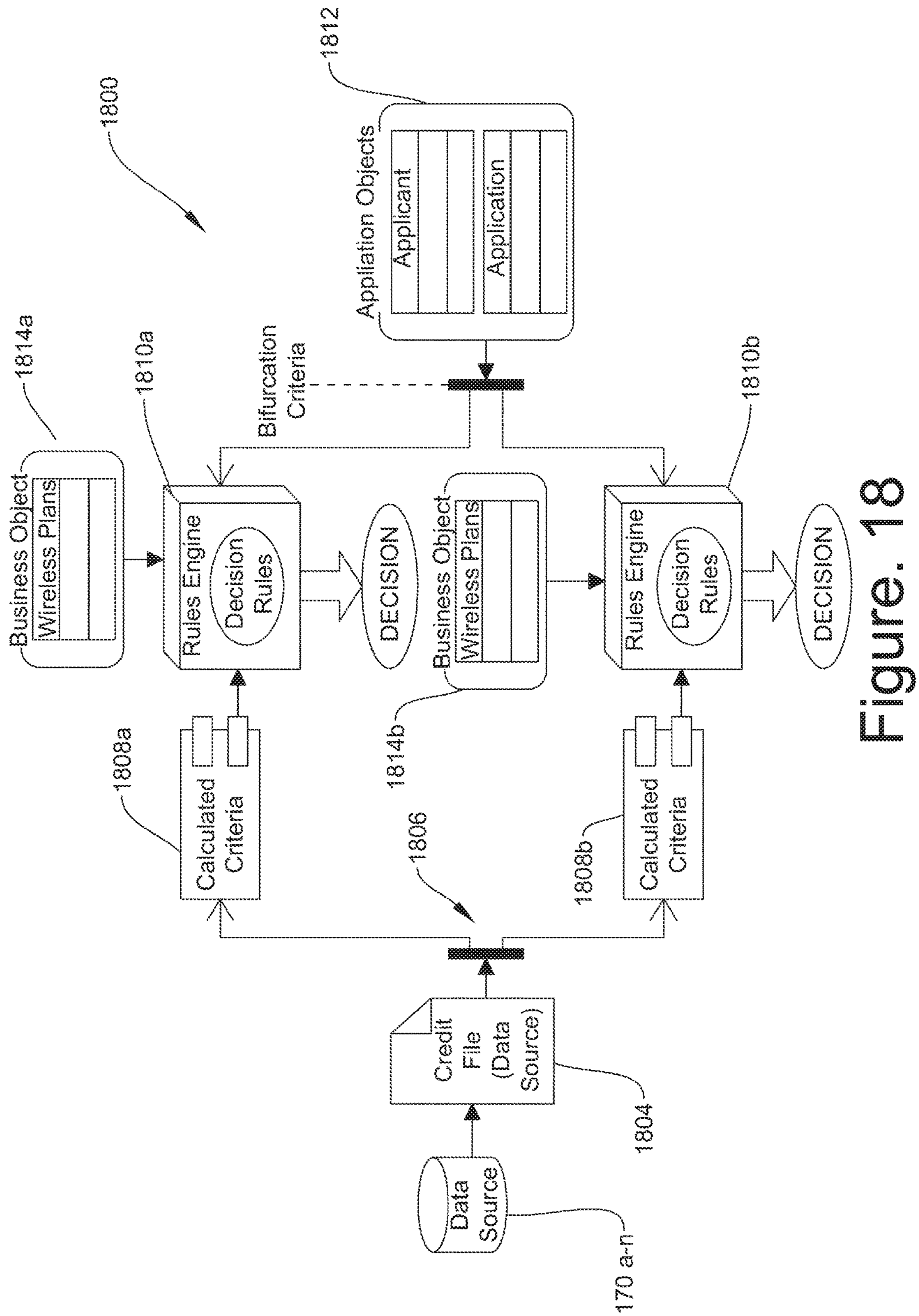
FIG. 18 depicts another example of a process for testing and updating a decision algorithm, in accordance with certain embodiments.

FIG. 18 illustrates another process 1800 that can be implemented by the trialing/challenger component 234. In FIG. 18, the process 1800 begins at block 1802. In block 1802, a particular data source 170*a-n* is selected. For example, a particular database storing certain entity data can be selected by users 112*a-n*.

At block 1804, a particular file having particular entity data is selected from the data source 170*a-n*.

At block 1806, a relevant decision algorithm can follow one or more execution paths.

Block 1806 is followed by blocks 1808*a-b*, in which different attributes and/or criteria can be calculated for each path.

Blocks 1808*a-b* are followed by blocks 1810*a-b*, respectively, in which a rules engine can receive calculated attributes and/or criteria and a decision data object, and a decision can be derived based at least in part on a selected strategy path. Note that a decision data object or other application objects can be received from block 1812, and associated data objects can be received from blocks 1814*a-b*, respectively.

In some embodiments, a software development and decisioning platform can be utilized to implement a workflow model as shown in FIG. 19. FIG. 19 illustrates a process diagram that can be implemented by a workflow component 230. Diagrams such as the one shown in FIG. 19 are useful for constructing and implementing a decision rule. The diagram illustrates a process 1900 with one or more decision rules for completing processing of a decision data object after a decision has been rendered. Each of the blocks 1902, 1904, 1906, 1910, 1912, 1914, and 1916 represents a respective function or set of functions, which can be performed using a computing system such as a server device 104, in a process for implementing one or more decision rules. Other types of diagrams, functional blocks, and diagram components can be utilized in accordance with other embodiments.

FIG. 20 illustrates a process diagram that can be implemented by a workflow component 230. The process 2000 shown begins at block 2002. At block 2004, which is an activity block labeled "validate order," an order can be validated.

At block 2006, which is a decision block labeled "Is valid," a determination is made whether the order is valid. If a decision such as "True" or "Yes" is determined, then the process 2000 continues at block 2008. At block 2008, which is an activity block labeled "Transform Order," the order is transformed. At block 2010, which is an activity block labeled "Process Order," the order is processed. At block 2012, which is an activity block labeled "Transform Response," an associated response is transformed. At block 2014, which is an email activity block labeled "Email Confirmation," a confirmation e-mail or other communication associated with the order and/or response is transmitted. At block 2016, the process 2000 ends.

Referring back to decision block 2006, if a decision such as "False" or "No" is determined, then the process 2000 continues to block 2018. At block 2018, which is an activity block labeled "Escalate Validation Failure," a validation feature is escalated, and the process 2000 ends.

One or more blocks depicted in FIG. 20 represent one or more functions that can be included in a decision algorithm, as performed by a computing system such as a server device 104. Other types of diagrams, functional blocks, and diagram components can be utilized in accordance with other embodiments.

FIG. 21 illustrates another process diagram that can be implemented by a workflow component 230 and that can be used for controlling a workflow between a user interface, a rules engine component 220, a data resource layer 206, and a data analysis layer 208. In this embodiment, a custom workflow of a customer entity can be implemented and automatically executed by a processing engine that processes decision data objects in accordance with the process model depicted in FIG. 21. The process 2100 shown includes a graphic of a user interface 2102 associated with a start block 2104.

At block 2106, which is labeled "Decision Prequalification (Rules)," a graphic of a user interface 2108 associated with block 2106 is shown. In block 2106, a set of prequalification rules is generated or otherwise selected.

At decision block 2110, which is labeled "Prequalified?," a determination is made whether a particular applicant is prequalified. If a "true" or "Yes" determination is made, then the process 2100 continues to block 2112. A graphic of a user interface 2114 associated with the block 2112 is shown.

Referring back to decision block 2110, if a "false" or "No" determination is made, then the process 2100 continues to block 2116. Block 2116 is labeled "Riskwise Information Decisioning." A graphic of an interface 2118 associated with block 2116 is shown. At block 2116, a particular data source can be selectively accessed, such as an external data source.

At decision block 2120, which is labeled "Sufficient Riskwise Score?," a determination is made as to whether the particular applicant meets or exceeds a threshold score associated with a data source such as a RiskWise™ database or routine, or a result of a function is evaluated. If a "false" or "No" determination is made, then a first response is received and forwarded to the following block. The process 2100 continues to end block 2112, where the process 2100 ends.

Referring back to decision block 2120, if a "true" or "Yes" determination is made, then the process 2100 continues to block 2122. Block 2122 is labeled "Information Decisioning." Graphics of a user interface 2124 and an interface 2126 associated with block 2122 are shown. At block 2122, information decisioning can be performed. One or more data sources can be accessed, and associated analytics processes can be executed to perform the decisioning. The process 2100 continues to end block 2112, where the process 2100 ends.

One or more blocks depicted in FIG. 21 can represent a respective function or set of functions in a decision algorithm, as performed by a computing system such as a server device 104. Other types of diagrams, functional blocks, user interfaces, interfaces, and diagram components can be utilized in accordance with other embodiments.

FIG. 22 illustrates a method 2200 implemented by a software development and decisioning platform for executing a decision algorithm with respect to one or more entities. Each block depicted in FIG. 22 represents a respective function or set of functions in a decision algorithm, as performed by a computing system such as a server device 104. Other types of diagrams, functional blocks, user interfaces, interfaces, and diagram components can be utilized in accordance with other embodiments.

At block 2202, a suitable computing system (e.g., one or more servers of a software development and decisioning platform) provides a user computer interface having elements that are configured to receive information associated with an applicant entity, to display information associated with one or more decision algorithms, and to receive information associated with one or more decision algorithms. For example, in the embodiment shown in FIG. 22, a user computer interface can be a GUI. By way of further example, an applicant entity can include, but is not limited to, an individual, a business, and a commercial institution.

At block 2204, the computing system receives information associated with the applicant entity through the provided user computer interface. For example, receiving information associated with an applicant entity can include, but is not limited to, receiving information from an applicant, receiving information entered into the user computer interface by a device associated with an applicant entity, receiving information from a data source associated with an applicant based on one or more inputs entered into the user computer interface, and receiving information selected via one or more inputs entered into the user computer interface.

Examples of information associated with an applicant entity can include, but are not limited to, identity information associated with the applicant, access information to authorize access to entity data from one or more third-party systems (e.g., a third-party system hosting an online credit reporting service), information associated with an applicant entity from at least one risk analysis data source, contact information associated with an applicant, name, current address, social security number, date of birth, an address, a name of a co-applicant, information associated with an applicant's spouse, information associated with an applicant's driver license, information associated with an applicant's employer, and information associated with applicant's income. Furthermore, information associated with an applicant can include, but is not limited to, risk analysis data, check processing service data, blue book data, credit reporting data, regional consumer exchange data, commercial data. Information associated with an applicant can also include information that is relevant to a customer solution.

At block 2206, the computing system receives information associated with the applicant from at least one data source. For example, receiving information associated with an applicant from at least one data source can include, but is not limited to, receiving information from a client device that has requested execution of a decision algorithm, receiving information from a data provider that hosts entity information, and receiving information from a database.

At block 2208, the computing system receives, through the user computer interface, a selection of information associated with one or more decision rules implemented by a decision algorithm. In the example shown, the user computer interface can be used to define at least one decision rule in a near-natural language. Information associated with multiple decision rules can include, but is not limited to, an attribute, a criteria, a workflow, a rule hierarchy, a workflow hierarchy, entity data associated with an applicant, a score, a statistical model, a threshold, a risk factor, information associated with at least one attribute, information associated with at least one criteria, information associated with a process performed by an entity, information associated with a business associated with an entity, and information associated with an industry associated with an entity.

At block 2210, the computing system receives, through the user computer interface, a selection of rule flow information associated with one or more decision rules implemented by a decision algorithm. For example, a client device can be used to select information associated with a decision rule by positioning an object on a user computer interface (e.g., a GUI), wherein the object is associated with at least one decision rule. Selection of rule flow information associated with various decision rules can include, but is not limited to, information from a template associated with the user computer interface. A template can include, but is not limited to, information associated with a user's business, information associated with a user's industry, information associated with a prospective customer of a user, information associated with a current customer of a user, information collected by a user, and information obtained by a user.

At block 2212, the computing system generates decision rules implemented in a decision algorithm based at least in part on the information associated with the applicant, the information associated with the applicant from at least one data source, and the selection of information associated with the decision rules, where an outcome associated with at least one of the decision rules can be obtained. In the embodiment shown in FIG. 22, an outcome can include, but is not limited to, denial of a credit line, granting an approval of a credit line, denial of a loan, granting approval of a loan, and approval for receiving an offer of credit.

At block 2214, the computing system updates the computer user interface to display, based on the rule flow information, at least a portion of the decision rules implemented by the decision algorithm. The computing system provides the updated computed user interface to a client device.

At block 2214, the method 2200 ends.

Figure 23:
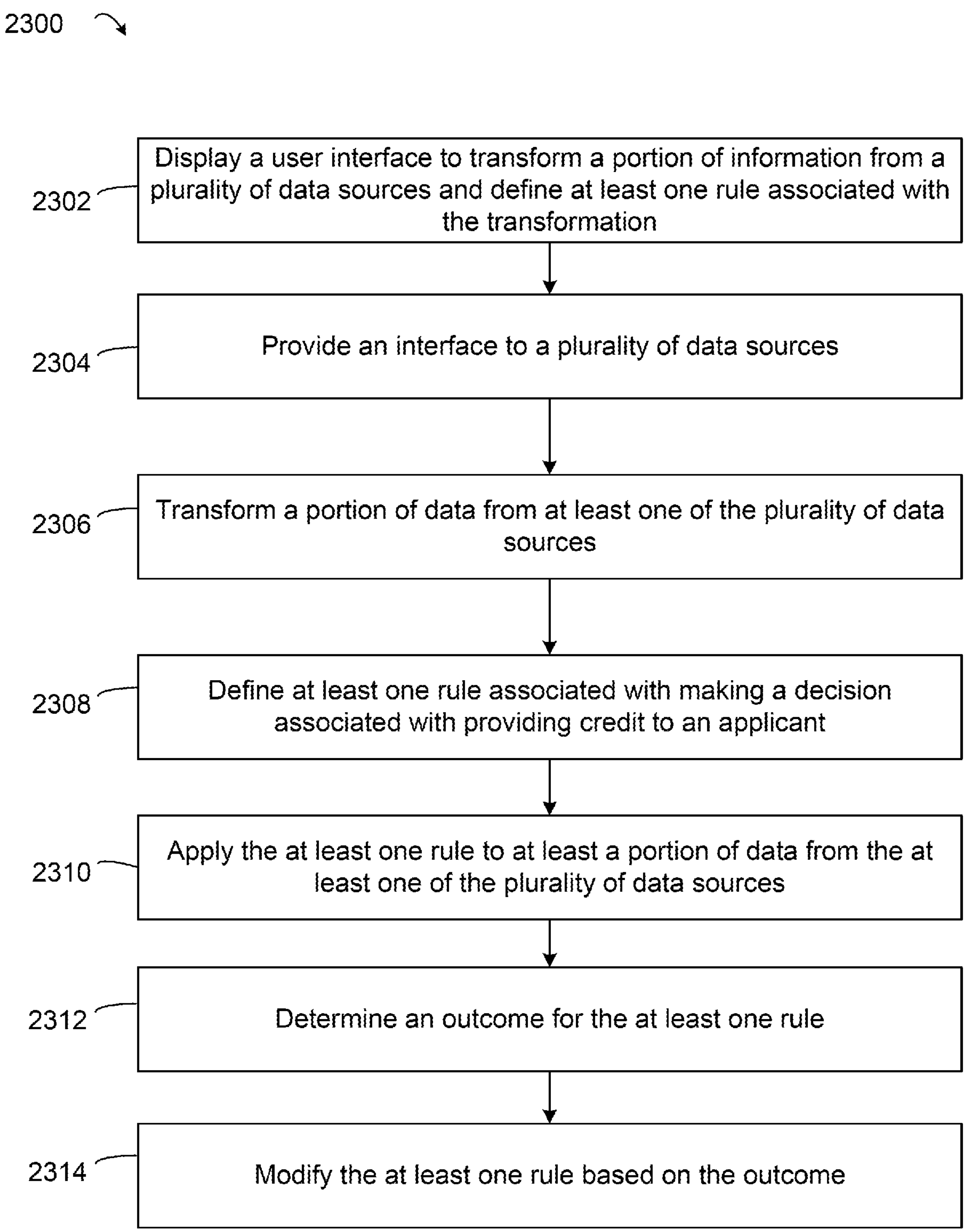
FIG. 23 depicts an example of a process for accessing multiple data sources for decisioning a service request associated with an applicant entity, in accordance with certain embodiments.

FIG. 23 illustrates an example of a method 2300 for accessing multiple data sources for decisioning a service request associated with an applicant entity. Each block depicted in FIG. 23 represents a respective function or set of functions in a computer-executed algorithm performed by a computing system such as a server device 104. Other types of diagrams, functional blocks, user interfaces, interfaces, and diagram components can be utilized in accordance with other embodiments.

At block 2302, a computing system provides a user computer interface that can be used to transform a portion of information from multiple data sources. The user computer interface can also be used to define at least one rule associated with transforming the portion of information from the data sources.

At block 2304, the computing system provides an interface to each of the data sources.

At block 2306, the computing system transforms a portion of data that is received from at least one of the data sources.

At block 2308, the computing system defines at least one rule associated with making a decision associated with providing a service to an applicant entity.

At block 2310, the computing system applies the defined rule to at least a portion of data from at least one of the data sources.

At block 2312, the computing system determines an outcome for the at least one rule.

At block 2314, the computing system modifies the at least one rule based on the outcome.

Figure 24:
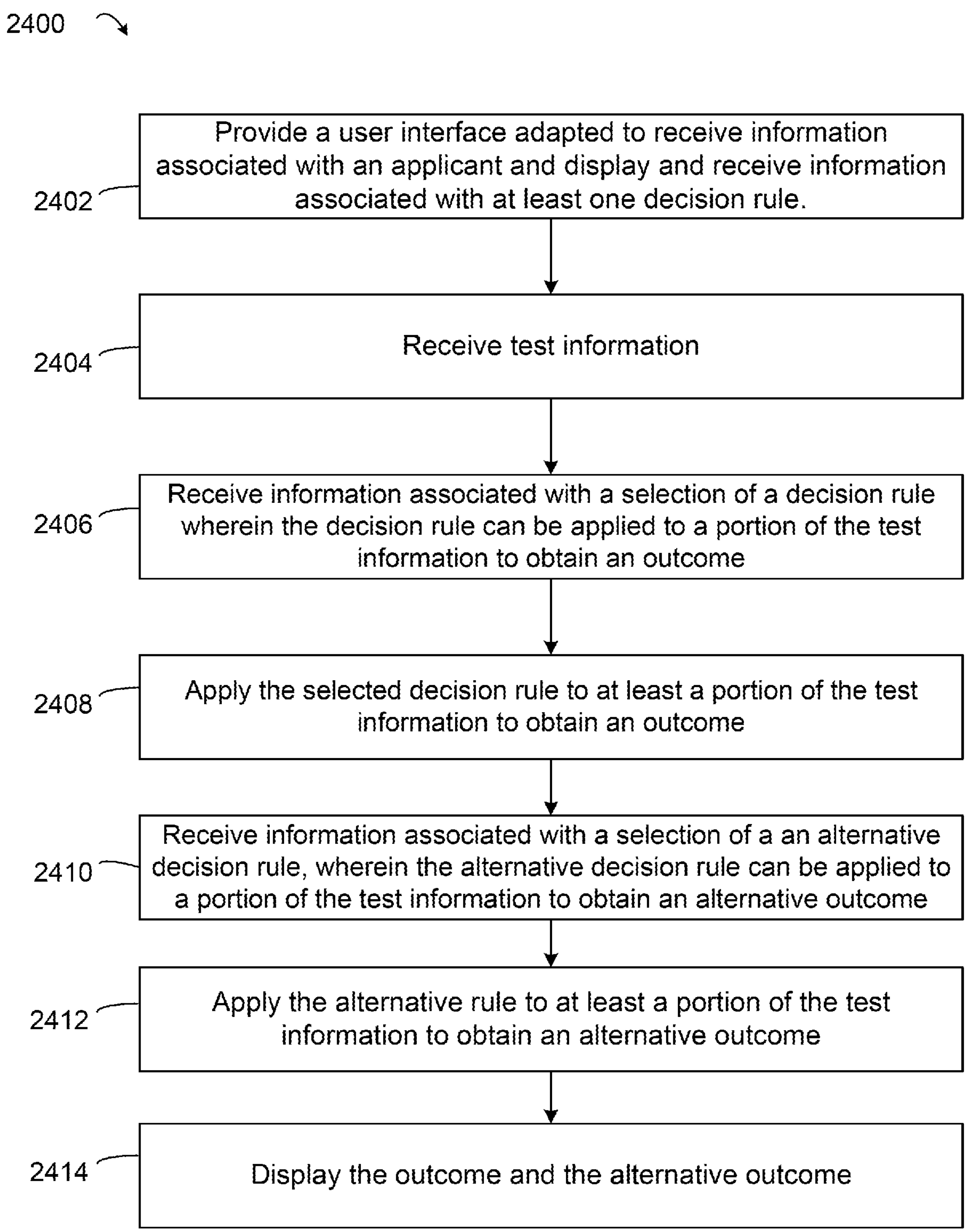
FIG. 24 depicts an example of a process for testing a decision algorithm, in accordance with certain embodiments.

FIG. 24 illustrates a method 2400, which is implemented by a software development and decisioning platform or another computing system, for testing a decision algorithm. Each block depicted in FIG. 24 represents a respective function or set of functions in a computer-executed algorithm performed by a computing system such as a server device 104. Other types of diagrams, functional blocks, user interfaces, interfaces, and diagram components can be utilized in accordance with other embodiments.

At block 2402, a computing system provides a software management interface that can be used to receive information associated with an applicant. The software management interface can also be used to display and receive information associated with at least one decision rule. In at least one embodiment, at least one decision rule can be defined in near-natural language. An example of a near natural language is a structured approximation of a natural language that omits one or more syntax features of a natural language, that is not directly executable by a computing device, and that can be converted to a format executable by computing devices. For instance, a near natural language statement (e.g., "If the applicant's channel equals active, then set applicant's income: true"), when compared to a corresponding natural language statement (e.g., "If the applicant's channel is active, then set the applicant's income to 'true'"), omits or replaces one or more syntax features of the corresponding natural language statement (e.g., using "equals" instead of "is," using ":true" instead of the preposition form and quotes such as "to 'true'", etc.). In this example, the near natural language statement is not written in source code or another programming language, but includes a structure that allows elements of the near natural language statement to be mapped to source code or another programming language for conversion and execution.

At block 2404, the computing system obtains test information. For example, the computing system accesses a first database that includes test data (e.g., off-line data, archived data, etc.). The first database is segregated or otherwise separate from a second database that includes live data (e.g., production data).

At block 2406, the computing system receives, via the software management interface, information associated with a selection of a particular decision algorithm from a set of decision algorithms. Each decision algorithm includes one or more program functions implementing one or more decision rules that can be applied to a portion of the test information to obtain an outcome. An example of information associated with a selection of a particular decision algorithm is a software version selection input (e.g., a first software version selection input identifying a first decision algorithm from a software version menu element in the software development interface). Receiving the software version selection input causes the computing system to execute the selected decision algorithm (e.g., the first decision algorithm).

At block 2408, the computing system applies the selected decision rule to at least a portion of the test information to obtain an outcome. An example of applying a selected decision rule to a portion of test information includes the computing system executing a first decision algorithm on at least some test data that is stored in a test database.

At block 2410, the computing system receives information associated with a selection of an alternative decision rule. The alternative decision rule can be applied to a portion of the test information to obtain an alternative outcome. An example of information associated with a selection of an alternative decision rule is a software version selection input (e.g., a second software version selection input identifying a second decision algorithm from a software version menu element in the software development interface). Receiving the software version selection input causes the computing system to execute the selected decision algorithm (e.g., the second decision algorithm).

At block 2412, the computing system applies the alternative rule to at least a portion of the test information. An example of applying a selected alternative rule to a portion of test information includes applying the selected decision rule to at least a portion of the test information including the computing system executing a second decision algorithm on at least some test data that is stored in a test database (e.g., the same portion of the test data as block 2408 or a different portion of the test data as compared to block 2408).

At block 2414, the computing system updates the software management interface to display the outcome and alternative outcome through the software management interface. The computing system provides the updated software management interface to a client device. An example of displaying the outcome and alternative outcome include the computing system causing a communication interface to provide (i) a first updated version of the software development interface to the client device responsive to the first decision algorithm being executed on the test data and (ii) a second updated version of the software development interface to the client device responsive to the second decision algorithm being executed on the test data, where each updated version displays or otherwise identifies a respective test result (i.e., the outcome of applying a particular decision rule).

In some embodiments, embodiments described herein can allow users to apply complex decision rules to multiple applications and requests by providing an intuitive GUI. These embodiments can allow the user to manage relatively large numbers of applications and requests in an efficient manner. Certain embodiments can also access one or more data sources, including credit databases, to provide desired decisioning calculations in a relatively high performance manner, thereby making these embodiments suitable for use on relatively large data sets, relatively high volumes of transactions over a data network that require the application of decision algorithms, or both. Some embodiments are useful in fulfilling user requests for credit data from multiple credit data sources. Embodiments according to various aspects and embodiments can operate on various operating systems or platforms including, but not limited to, Windows NT®, UNIX®, AIX®, personal computers, mainframes, parallel processing platforms, and supercomputers.

Embodiments described herein can provide various features that facilitate efficient end user operations involving geographically separated clients, decision servers, and data sources. Some embodiments can provide direct, real-time application processing control and decision results. Some embodiments can provide control of how a decision report is prepared. Some embodiments can provide control over access to credit data and related information. Some embodiments can provide control over and ability to conduct trialing or experimentation with certain models, criteria, attributes or any other variables that relate to requesting or delivery of reports, decisions, diligence, or other information. Some embodiments can provide application and decision modularity, reusability, or both. Some embodiments can provide flexible and generalized data source access. Some embodiments can provide customizable user interfaces. Some embodiments can provide a user with the capability to enter near natural language commands to define decision rules. Some embodiments can provide a user interface driven by data transformation. Some embodiments can provide comprehensive strategy implementation for trialing combinations of rules and data sources to determine whether the form and substance of data output is suitable. Some embodiments can provide comprehensive delegated security governing access and degree of control over various components of such embodiments. Some embodiments can provide integrated analytics to segment and decision applications, requests, and accounts based on risk and profitability levels and to determine appropriate action.

General Considerations

While embodiments of the invention have been illustrated and described, it will be clear that the invention is not limited to these embodiments only. Numerous modifications, combinations of different embodiments, changes, variations, substitutions, and equivalents will be apparent to those skilled in the art, without departing from the spirit and scope of the invention, as described in the claims.

The invention claimed is:

1. A software development system comprising:

a communication interface configured for establishing, via one or more data networks, a connection to a client device and for providing a software development interface to the client device via the connection;

one or more non-transitory computer-readable media having a first database in which test data is stored and a second database in which production data is stored; and one or more server devices communicatively coupled to the non-transitory computer-readable media and the communication interface, the one or more server devices configured for performing operations comprising:

providing, in the software development interface, (i) a mode selection element, (ii) a software version menu element, and (iii) an element selection menu comprising a set of algorithm functions and a set of data objects, receiving, from the client device, a first source-selection input at the mode selection element, a first software version selection input at the software version menu element, and a second software version selection input at the software version menu element, receiving, from the client device, a flow path input connecting a first icon representing an algorithm function from the set of algorithm functions and a second icon representing a decision object from the set of data objects, setting, based on the first source-selection input, a decision engine to a test mode that causes the decision engine to operate on the test data in the first database and that prevents the decision engine from applying operations from the client device to the production data in the second database, configuring the decision engine in the test mode to (i) execute a first decision algorithm on the test data based on receiving the first software version selection input and (ii) execute a second decision algorithm on the test data based on receiving the second software version selection input, creating, based on the first icon and the second icon being connected via the flow path input, one or more of (i) first decision code for performing a decision based on an output of the first decision algorithm or (ii) second decision code for performing a decision to initiate the first decision algorithm, causing the communication interface to provide (i) a first updated version of the software development interface to the client device responsive to the first decision algorithm being executed on the test data and (ii) a second updated version of the software development interface to the client device responsive to the second decision algorithm being executed on the test data, the first updated version of the software development interface displaying a first test result and the second updated version of the software development interface displaying a second test result, receiving, from the client device, a second source-selection input at the mode selection element, setting, based on the second source-selection input, the decision engine to a deployment mode that causes the decision engine to operate on the production data in the second database, and configuring the decision engine in the deployment mode to execute the second decision algorithm on the production data based on receiving the second software version selection input.

2. The software development system of claim 1, wherein the one or more server devices are further configured for creating one or more of the first decision algorithm and the second decision algorithm responsive to receiving, at least, the flow path input.

3. The software development system of claim 1, wherein the one or more server devices are further configured for creating one or more of the first decision algorithm and the second decision algorithm by performing definition operations comprising:

receiving, from the client device, a first input selecting the first icon; and receiving, from the client device, a second input selecting the second icon.

4. The software development system of claim 3, wherein the first input drags the first icon to a definition region of the software development interface, the second input drags the second icon to the definition region of the software development interface, and the flow path input connects the first icon and the second icon in the definition region.

5. The software development system of claim 1, further comprising:

the client device configured for transmitting, to the one or more server devices, inputs comprising the first source-selection input, the second source-selection input, the flow path input, the first software version selection input, and the second software version selection input, wherein the software development system is configured for communicating the inputs and performing the operations in real-time and during the connection between the one or more server devices and the client device.

6. The software development system of claim 1, wherein configuring the decision engine in the test mode to execute the second decision algorithm on the production data comprises replacing operations performed on the production data by the first decision algorithm with operations performed on the production data by the second decision algorithm.

7. The software development system of claim 1, the operations further comprising:

providing, to the client device, a definition region of the software development interface, the definition region displaying additional icons representing algorithmic functions from the second decision algorithm and additional flow paths depicting connections among the additional icons;

receiving, from the client device and after providing one or more of the first updated version of the software development interface or the second updated version of the software development interface, one or more dragging inputs in the definition region that change the connections depicted by the additional flow paths; and modifying, based on the connections as changed by the one or more dragging inputs, an order of the algorithmic functions from the second decision algorithm, wherein the one or more server devices are configured for causing the decision engine in the deployment mode to execute the second decision algorithm, as modified, on the production data.

8. A method in which one or more processing devices of a software development system perform operations comprising:

providing, via a connection to a client device, a software development interface to the client device via the connection, the software development interface having a mode selection element, a software version menu element, and an element selection menu comprising a set of algorithm functions and a set of data objects;

receiving, from the client device, a first source-selection input at the mode selection element, a first software version selection input at the software version menu element, and a second software version selection input at the software version menu element;

receiving, from the client device, a flow path input connecting a first icon representing an algorithm function from the set of algorithm functions and a second icon representing a decision object from the set of data objects;

setting, based on the first source-selection input, a decision engine to a test mode that causes the decision engine to operate on test data stored in a first database and that prevents the decision engine from applying operations from the client device to production data stored in a second database;

configuring the decision engine in the test mode to (i) execute a first decision algorithm on the test data based on receiving the first software version selection input and (ii) execute a second decision algorithm on the test data based on receiving the second software version selection input;

creating, based on the first icon and the second icon being connected via the flow path input, one or more of (i) first decision code for performing a decision based on an output of the first decision algorithm or (ii) second decision code for performing a decision to initiate the first decision algorithm;

providing, via the connection, (i) a first updated version of the software development interface to the client device responsive to the first decision algorithm being executed on the test data and (ii) a second updated version of the software development interface to the client device responsive to the second decision algorithm being executed on the test data, the first updated version of the software development interface displaying a first test result and the second updated version of the software development interface displaying a second test result;

receiving, from the client device, a second source-selection input at the mode selection element;

setting, based on the second source-selection input, the decision engine to a deployment mode that causes the decision engine to operate on the production data in the second database; and configuring the decision engine in the deployment mode to execute the second decision algorithm on the production data based on receiving the second software version selection input.

9. The method of claim 8, wherein the operations further comprise creating one or more of the first decision algorithm and the second decision algorithm responsive to receiving, at least, the flow path input.

10. The method of claim 8, wherein the operations further comprise creating one or more of the first decision algorithm and the second decision algorithm by performing definition operations comprising:

receiving, from the client device, a first input selecting the first icon; and receiving, from the client device, a second input selecting the second icon.

11. The method of claim 10, wherein the first input drags the first icon to a definition region of the software development interface, the second input drags the second icon to the definition region of the software development interface, and the flow path input connects the first icon and the second icon in the definition region.

12. The method of claim 8, the operations further comprising:

receiving, from the client device, inputs comprising the first source-selection input, the second source-selection input, the flow path input, the first software version selection input, and the second software version selection input, wherein the inputs are received and the operations are performed in real-time and during the connection with the client device.

13. The method of claim 8, wherein configuring the decision engine in the test mode to execute the second decision algorithm on the production data comprises replacing operations performed on the production data by the first decision algorithm with operations performed on the production data by the second decision algorithm.

14. The method of claim 8, the operations further comprising:

providing, to the client device, a definition region of the software development interface, the definition region displaying additional icons representing algorithmic functions from the second decision algorithm and additional flow paths depicting connections among the additional icons;

receiving, from the client device and after providing one or more of the first updated version of the software development interface or the second updated version of the software development interface, one or more dragging inputs in the definition region that change the connections depicted by the additional flow paths; and modifying, based on the connections as changed by the one or more dragging inputs, an order of the algorithmic functions from the second decision algorithm, wherein the decision engine, in the deployment mode, executes the second decision algorithm, as modified, on the production data.

15. A non-transitory computer-readable medium storing program code executable by one or more processing devices, wherein the program code, when executed by the one or more processing devices, causes the one or more processing devices to perform operations comprising:

providing, via a connection to a client device, a software development interface to the client device via the connection, the software development interface having a mode selection element, a software version menu element, and an element selection menu comprising a set of algorithm functions and a set of data objects;

receiving, from the client device, a first source-selection input at the mode selection element, a first software version selection input at the software version menu element, and a second software version selection input at the software version menu element;

receiving, from the client device, a flow path input connecting a first icon representing an algorithm function from the set of algorithm functions and a second icon representing a decision object from the set of data objects;

setting, based on the first source-selection input, a decision engine to a test mode that causes the decision engine to operate on test data stored in a first database and that prevents the decision engine from applying operations from the client device to production data stored in a second database;

configuring the decision engine in the test mode to (i) execute a first decision algorithm on the test data based on receiving the first software version selection input and (ii) execute a second decision algorithm on the test data based on receiving the second software version selection input;

creating, based on the first icon and the second icon being connected via the flow path input, one or more of (i) first decision code for performing a decision based on an output of the first decision algorithm or (ii) second decision code for performing a decision to initiate the first decision algorithm;

providing, via the connection, (i) a first updated version of the software development interface to the client device responsive to the first decision algorithm being executed on the test data and (ii) a second updated version of the software development interface to the client device responsive to the second decision algorithm being executed on the test data, the first updated version of the software development interface displaying a first test result and the second updated version of the software development interface displaying a second test result;

receiving, from the client device, a second source-selection input at the mode selection element;

setting, based on the second source-selection input, the decision engine to a deployment mode that causes the decision engine to operate on the production data in the second database; and configuring the decision engine in the deployment mode to execute the second decision algorithm on the production data based on receiving the second software version selection input.

16. The non-transitory computer-readable medium of claim 15, wherein the operations further comprise creating one or more of the first decision algorithm and the second decision algorithm responsive to receiving, at least, the flow path input.

17. The non-transitory computer-readable medium of claim 15, wherein the operations further comprise creating one or more of the first decision algorithm and the second decision algorithm by performing definition operations comprising:

receiving, from the client device, a first input selecting the first icon; and receiving, from the client device, a second input selecting the second icon, wherein the first input drags the first icon to a definition region of the software development interface, the second input drags the second icon to the definition region of the software development interface, and the flow path input connects the first icon and the second icon in the definition region.

18. The non-transitory computer-readable medium of claim 15, the operations further comprising:

receiving, from the client device, inputs comprising the first source-selection input, the second source-selection input, the flow path input, the first software version selection input, and the second software version selection input, the inputs are received and the operations are performed in real-time and during the connection with the client device.

19. The non-transitory computer-readable medium of claim 15, wherein configuring the decision engine in the test mode to execute the second decision algorithm on the production data comprises replacing operations performed on the production data by the first decision algorithm with operations performed on the production data by the second decision algorithm.

20. The non-transitory computer-readable medium of claim 15, the operations further comprising:

providing, to the client device, a definition region of the software development interface, the definition region displaying additional icons representing algorithmic functions from the second decision algorithm and additional flow paths depicting connections among the additional icons;

receiving, from the client device and after providing one or more of the first updated version of the software development interface or the second updated version of the software development interface, one or more dragging inputs in the definition region that change the connections depicted by the additional flow paths; and modifying, based on the connections as changed by the one or more dragging inputs, an order of the algorithmic functions from the second decision algorithm, wherein the decision engine, in the deployment mode, executes the second decision algorithm, as modified, on the production data.

* * * * *